(12) United States Patent
Takanishi et al.

(10) Patent No.: US 10,220,897 B2
(45) Date of Patent: Mar. 5, 2019

(54) MOBILE ROBOT AND FRONT END TOOL

(71) Applicants: MITSUBISHI HEAVY INDUSTRIES, LTD., Tokyo (JP); WASEDA UNIVERSITY, Tokyo (JP)

(72) Inventors: Atsuo Takanishi, Tokyo (JP); Kenji Hashimoto, Tokyo (JP); Kazuhiro Uryu, Tokyo (JP); Tomotaka Teramachi, Tokyo (JP); Takashi Matsuzawa, Tokyo (JP); Ayanori Koizumi, Tokyo (JP); Shinya Hamamoto, Tokyo (JP); Takuya Otani, Tokyo (JP); Tatsuhiro Kishi, Tokyo (JP); Tomohiro Tami, Tokyo (JP); Hiroyuki Yamada, Tokyo (JP); Shigetoshi Shiotani, Tokyo (JP); Yusuke Kinouchi, Tokyo (JP); Yasuo Fujishima, Tokyo (JP)

(73) Assignees: MITSUBISHI HEAVY INDUSTRIES, LTD., Tokyo (JP); WASEDA UNIVERSITY, Tokyo (JP)

( * ) Notice: Subject to any disclaimer, the term of this patent is extended or adjusted under 35 U.S.C. 154(b) by 42 days.

(21) Appl. No.: 15/290,368

(22) Filed: Oct. 11, 2016

(65) Prior Publication Data
US 2017/0029049 A1  Feb. 2, 2017

Related U.S. Application Data

(62) Division of application No. 14/833,521, filed on Aug. 24, 2015, now Pat. No. 9,845,122.

(30) Foreign Application Priority Data

Dec. 25, 2014 (JP) .................................. 2014-263528

(51) Int. Cl.
*B62D 57/032* (2006.01)
*B25J 9/08* (2006.01)

(52) U.S. Cl.
CPC .............. *B62D 57/032* (2013.01); *B25J 9/08* (2013.01); *Y10S 901/01* (2013.01); *Y10S 901/02* (2013.01); *Y10S 901/28* (2013.01); *Y10S 901/30* (2013.01)

(58) Field of Classification Search
CPC ........ B62D 57/032; B62D 57/024; B25J 9/08; Y10S 901/01; Y10S 901/02; Y10S 901/28; Y10S 901/31; Y10S 901/39
See application file for complete search history.

(56) References Cited

U.S. PATENT DOCUMENTS 4,527,650 A    7/1985  Bartholet
4,637,494 A *  1/1987  Iida ......................... B66B 9/02
                                                      104/154

(Continued)

FOREIGN PATENT DOCUMENTS

JP    9-168982    6/1997
JP    2006-15456  1/2006

OTHER PUBLICATIONS

Office Action dated Jan. 13, 2017 in U.S. Appl. No. 14/833,521.

*Primary Examiner* — Joseph M Rocca
*Assistant Examiner* — Michael R Stabley
(74) *Attorney, Agent, or Firm* — Wenderoth, Lind & Ponack, L.L.P.

(57) ABSTRACT

A mobile robot 1 having a plurality of kinds of moving forms includes a body unit 11 having a front face and a back face, four limb units 12 having a plurality of limb-side drive shafts, and front end tools 13 provided on a front end side of the limb units 12. A base end side of the limb unit 12 is connected to the body unit 11. The four limb units 12 are the same units. The body unit 11 and the four limb units 12 are (Continued)

movable by switching a front face side and a back face side so that a moving operation of the front face side and a moving operation of the back face side are symmetrical across the center of a thickness direction of the body unit 11.

3 Claims, 14 Drawing Sheets

(56) References Cited

U.S. PATENT DOCUMENTS

| | | | |
|---|---|---|---|
| 4,793,439 A * | 12/1988 | Crawford | A63B 27/00 |
| | | | 182/136 |
| 5,005,658 A | 4/1991 | Bares et al. | |
| 5,040,626 A | 8/1991 | Paynter | |
| 5,151,859 A | 9/1992 | Yoshino et al. | |
| 5,213,172 A * | 5/1993 | Paris | B62D 57/024 |
| | | | 180/8.1 |
| 5,219,410 A | 6/1993 | Garrec | |
| 5,762,153 A | 6/1998 | Zamagni | |
| 5,838,130 A | 11/1998 | Ozawa | |
| 6,243,623 B1 | 6/2001 | Takenaka et al. | |
| 6,588,701 B2 | 7/2003 | Yavnai | |
| 7,086,502 B2 * | 8/2006 | Yim | A63B 27/00 |
| | | | 182/133 |
| 7,099,743 B2 | 8/2006 | Lee et al. | |
| 7,278,501 B2 | 10/2007 | Mori et al. | |
| 7,339,340 B2 | 3/2008 | Summer et al. | |
| 7,734,375 B2 | 6/2010 | Buehler et al. | |
| 8,100,205 B2 | 1/2012 | Gettings et al. | |
| 8,157,032 B2 | 4/2012 | Gettings | |
| 8,397,842 B2 | 3/2013 | Gettings | |
| 8,434,575 B2 | 5/2013 | Gettings et al. | |
| 8,544,573 B2 | 10/2013 | Gettings et al. | |
| 8,657,042 B2 | 2/2014 | Mantzel | |
| 8,978,792 B2 * | 3/2015 | Fauroux | B62D 57/024 |
| | | | 180/8.1 |
| 9,205,554 B2 * | 12/2015 | Hayden | A01G 23/0955 |
| 2008/0109115 A1 | 5/2008 | Lim | |
| 2009/0200090 A1 | 8/2009 | Takanishi | |

* cited by examiner

THICKNESS DIRECTION

LENGTH DIRECTION ↔ WIDTH DIRECTION

R: ROLL SHAFT
P: PITCH SHAFT
Y: YAW SHAFT

MOBILE ROBOT AND FRONT END TOOL

FIELD

The present invention relates to a mobile robot having a plurality of kinds of different moving forms and a front end tool.

BACKGROUND

A mobile robot for performing four-legged walking has been known as a mobile robot in the related art (for example, refer to Patent Literature 1). The mobile robot is formed by using a plurality of modules having a plurality of degrees of freedom. Also, a multi-articulated robot which is formed by coupling a plurality of elements with each other has been known as a mobile robot (for example, refer to Patent Literature 2). The multi-articulated robot is formed by coupling the plurality of elements and moves by moving up and down like undulations a part of the elements and forming traveling waves by the elements.

CITATION LIST

Patent Literature

Patent Literature 1: Japanese Patent Application Laid-Open No. 2006-15456
Patent Literature 2: Japanese Patent Application Laid-Open No. 9-168982

SUMMARY

Technical Problem

It is desired that the mobile robot have a plurality of kinds of different moving forms according to a moving environment. As the moving form, four-legged walking, two-legged walking, or the like is performed by the mobile robot as illustrated in Patent Literature 1. Such a mobile robot may fall down when moving on the irregular ground. When the mobile robot falls down, it can be a cause of a failure. Also, it is necessary to perform a return operation to return to the original moving form. Here, when the mobile robot falls down in a state of lying on its back, the mobile robot cannot smoothly perform the return operation, and it takes time to complete the return operation. Accordingly, it is difficult to achieve a necessary task within a required time.

Accordingly, it is object of the present invention to provide a mobile robot and an end front tool that can preferably move in a moving form according to moving environment.

Solution to Problem

According to an aspect of the present invention, a mobile robot having a plurality of kinds of different moving forms, includes: a body unit configured to include a front face and a back face; a plurality of limb units configured to include a base end side to be connected to the body unit and include a plurality of drive shafts; and a front end tool configured to be provided on a front end side of the limb unit. When it is assumed that a direction to which the front face and the back face of the body unit face be a thickness direction, a direction perpendicular to the thickness direction be a length direction, a direction perpendicular to the thickness direction and the length direction be a width direction, end surfaces on both end sides in the length direction be a top surface and a bottom surface, and end surfaces on both end sides in the width direction be a left side face and a right side face, the plurality of limb units is the same unit, and the body unit and the plurality of limb units are movable by switching the front face side and the back face side so that a moving operation on the front face side and a moving operation on the back face side are symmetrical across the center in the thickness direction of the body unit.

With this structure, even when the mobile robot falls down in a state of lying on its back in which the front face side of the body unit comes on the upper side, the front face side and the back face side of the body unit and the plurality of limb units can be switched. Therefore, the mobile robot can be returned from the state of lying on its stomach in which the front face side of the body unit comes on the lower side to the state before falling down by switching the front face side and the back face side. Accordingly, even when the mobile robot moves by using the plurality of kinds of different moving forms, the return operation and the like can be smoothly performed by switching the front face side and the back face side. Therefore, the mobile robot can preferably move.

Advantageously, in the mobile robot, the body unit and the plurality of limb units are movable by switching the top surface side and the bottom surface side so that a moving operation on the top surface side and a moving operation on the bottom surface side are symmetrical across the center in the length direction of the body unit.

With this structure, even when the mobile robot moves to the top surface side or the bottom surface side according to the moving form, the movement to the top surface side and the movement to the bottom surface side can be switched by switching the top surface side and the bottom surface side of the body unit and the plurality of limb units. Therefore, the mobile robot can preferably move.

Advantageously, in the mobile robot, at least two limb units of the plurality of limb units are respectively attached to the left side face and the right side face of the body unit, and when it is assumed that a direction rotating around an axis direction which is the length direction of the body unit be a roll direction, a direction rotating around an axis direction which is the width direction of the body unit be a pitch direction, and a direction rotating around an axis direction which is the thickness direction of the body unit be a yaw direction, at least two drive shafts provided on the base end side are the drive shaft in the roll direction and the drive shaft in the pitch direction in a state where the limb unit is stretched in the thickness direction of the body unit.

With this structure, since the base end side of the limb unit can be operated in the roll direction and the pitch direction relative to the body unit, a movable range of the limb unit can be wider.

Advantageously, in the mobile robot, when it is assumed that a direction rotating around an axis direction which is the length direction of the body unit be a roll direction, a direction rotating around an axis direction which is the width direction of the body unit be a pitch direction, and a direction rotating around an axis direction which is the thickness direction of the body unit be a yaw direction, at least two drive shafts provided on a front end side are the drive shaft in the roll direction and the drive shaft in the pitch direction in a state where the limb unit is stretched in the thickness direction of the body unit.

With this structure, the front end side of the limb unit can be operated in the roll direction and the pitch direction relative to the front end tool. Therefore, for example, when moving on its stomach is performed as the moving form, the moving on its stomach can be performed by reducing the height of the mobile robot. Accordingly, the mobile robot can pass through a narrow part where there is a limit in the height direction.

Advantageously, in the mobile robot, at least two limb units of the plurality of limb units are respectively attached to the left side face and the right side face of the body unit, when it is assumed that a direction rotating around an axis direction which is the length direction of the body unit be a roll direction, a direction rotating around an axis direction which is the width direction of the body unit be a pitch direction, and a direction rotating around an axis direction which is the thickness direction of the body unit be a yaw direction, in a state where the limb unit is stretched in the thickness direction of the body unit, at least two drive shafts provided on a base end side are the drive shaft in the roll direction and the drive shaft in the pitch direction, and at least two drive shafts provided on a front end side are the drive shaft in the roll direction and the drive shaft in the pitch direction, and at least three drive shafts respectively provided between the two drive shafts provided on the base end side and the two drive shafts provided on the front end side are two drive shafts in the yaw direction and the drive shaft in the pitch direction.

With this structure, since the base end side of the limb unit can be operated in the roll direction and the pitch direction relative to the body unit, a movable range of the limb unit can be wider. The front end side of the limb unit can be operated in the roll direction and the pitch direction relative to the front end tool. Therefore, for example, when moving on its stomach is performed as the moving form, the moving on its stomach can be performed by reducing the height of the mobile robot. Accordingly, the stability at the time of moving can be increased. Also, even when the moving environment is irregular ground, the front end tool can be preferably grounded to the irregular ground by operating the front end side in the yaw direction relative to the base end part of the limb unit. Therefore, the stability at the time of moving can be increased. One of the drive shafts in the yaw direction is a redundant shaft.

Advantageously, in the mobile robot, when it is assumed that a direction rotating around an axis direction which is the length direction of the body unit be a roll direction, a direction rotating around an axis direction which is the width direction of the body unit be a pitch direction, and a direction rotating around an axis direction which is the thickness direction of the body unit be a yaw direction, the body unit includes at least one of the drive shaft in the pitch direction and the drive shaft in the roll direction.

With this structure, the body unit can be bent forward and backward by the drive shaft in the pitch direction. Also, the body unit can be twisted by the drive shaft in the roll direction. Therefore, as the moving form, for example, when climbing up/down the ladder, the body unit can be bent forward relative to the ladder. Therefore, the base end part of the limb unit can be moved closer to the side of the ladder. Accordingly, the mobile robot can climb up/down the ladder in the state where the distance from the ladder to the body unit is reduced. Even when the protection fence is provided around the ladder, the mobile robot can preferably climb up/down the ladder. Also, for example, when the drive shafts in the pitch direction and the roll direction are used, the body unit can be twisted in a state where the body unit is bent backward. Therefore, the base end part of the limb unit can be raised high.

Advantageously, in the mobile robot, the body unit includes wheels which are respectively provided on the front face side and the back face side.

With this structure, since the wheels can be grounded by moving the body unit closer to the ground, it can be prevented that the body unit contacts the ground. Also, the body unit can smoothly move by rolling the wheels.

Advantageously, in the mobile robot, the limb unit is formed by coupling a plurality of joint modules including one or more drive shafts.

With this structure, the limb unit can be easily assembled by coupling the plurality of joint modules. Also, since each joint module can be exchanged, the exchange operation when the limb unit has a failure can be easier.

Advantageously, in the mobile robot, the kinds of the plurality of joint modules of the limb unit are different from each other, and the plurality of drive shafts respectively provided in the plurality of joint modules is the same.

With this structure, since the plurality of different kinds of joint modules can use the same drive shafts, components can be used in common.

Advantageously, in the mobile robot, the limb unit includes a first drive shaft which is a predetermined drive shaft of the plurality of drive shafts, a second drive shaft, which is inclined by a predetermined angle relative to the first drive shaft, of the plurality of drive shafts, and a holding frame which holds the second drive shaft therein and has the first drive shaft attached outside the holding frame, the holding frame includes a recessed part formed in an outer surface of the holding frame by being recessed inward, and a part of the first drive shaft is stored in the recessed part, and the first drive shaft is attached to the holding frame.

With this structure, since the length of the first drive shaft in the axis direction can be shortened by a length in which a part of the first drive shaft can be stored in the recessed part, the size of the mobile robot can be reduced.

Advantageously, in the mobile robot, the front end tool is removable to the limb unit.

With this structure, the front end tool can be changed to different kinds of the front end tools.

Advantageously, in the mobile robot, a part to be grounded is formed to be a flat surface in the front end tool, and a locking groove which is locked to a bar-shaped member extending in the horizontal direction and a hook groove which is hooked to the bar-shaped member are formed side by side on the flat surface.

With this structure, when the two-legged walking or the four-legged walking is performed as the moving form, the flat surface can be grounded. Therefore, the stability at the time of moving can be increased. Also, when the mobile robot climbs up/down the ladder as the moving form, the locking grooves of the front end tools attached to the two limb units on the lower side can be locked to the rung of the ladder, and the hook grooves of the front end tools attached to the two limb units on the upper side can be hooked to the rung or the support of the ladder. Therefore, the mobile robot can preferably climb up/down the ladder.

Advantageously, in the mobile robot, a part to be grounded is formed to be a flat surface in the front end tool, and a holding unit which holds an object is provided on a part opposite to the flat surface.

With this structure, when the two-legged walking or the four-legged walking is performed as the moving form, the flat surface can be grounded. Therefore, the stability at the time of moving can be increased. Also, since the holding unit can hold the object, the mobile robot can work by using the holding unit.

Advantageously, in the mobile robot, a part to be grounded is formed to be a flat surface in the front end tool, and the limb unit is connected to a part opposite to the flat surface, a locking groove which is locked to a bar-shaped member and a hook groove which is hooked to the bar-shaped member are formed in parallel on the flat surface, a part on the flat surface on the side of the hook groove is formed to be branched into two parts on both sides of a space, and a holding unit which holds an object is provided to be stored in the space.

With this structure, when the two-legged walking or the four-legged walking is performed as the moving form, the flat surface can be grounded. Therefore, the stability at the time of moving can be increased. Also, when the mobile robot climbs up/down the ladder as the moving form, the locking grooves of the front end tools attached to the two limb units on the lower side can be locked to the rung of the ladder, and the hook grooves of the front end tools attached to the two limb units on the upper side can be hooked to the rung or the support of the ladder. Therefore, the mobile robot can preferably climb up/down the ladder. In addition, since the holding unit can hold the object, the mobile robot can work by using the holding unit. At this time, the holding unit can be stored in the space, the mobile robot can climb up/down the ladder without being blocked by the holding unit.

Advantageously, in the mobile robot, the front end tool includes an image pickup device.

With this structure, an environment around the front end tool can be visually recognized by an image imaged by the image pickup device.

Advantageously, in the mobile robot, the front end tool includes a connection part connected to the limb unit, a toe part provided on one side across the connection part, and a heel part provided on the other side across the connection part, and a part of the toe part which is grounded at the time of standing on tiptoe and moving is a curved surface.

With this structure, a part to be the curved surface of the toe part of the front end tool can be surely grounded, for example, even when the drive of a part of a plurality of drive shafts of the limb unit is stopped at the time of the four-legged walking. Therefore, since the drive of a part of the drive shafts can be stopped, power consumption can be reduced.

According to another aspect of the present invention, a front end tool which is to be attached to a mobile robot having a plurality of kinds of different moving forms, includes a body unit and a plurality of limb units of which a base end side is connected to the body unit. A part to be grounded is formed to be a flat surface, and a locking groove which is locked to a bar-shaped member extending in the horizontal direction and a hook groove which is hooked to the bar-shaped member are formed side by side on the flat surface.

With this structure, when the two-legged walking or the four-legged walking is performed as the moving form, the flat surface can be grounded. Therefore, the stability at the time of moving can be increased. Also, when the mobile robot climbs up/down the ladder as the moving form, the locking grooves of the front end tools attached to the two limb units on the lower side can be locked to the rung of the ladder, and the hook grooves of the front end tools attached to the two limb units on the upper side can be hooked to the rung or the support of the ladder. Therefore, the mobile robot can preferably climb up/down the ladder.

According to still another aspect of the present invention, a front end tool which is to be attached to a mobile robot having a plurality of kinds of different moving forms, includes a body unit and a plurality of limb units of which a base end side is connected to the body unit. A part to be grounded is formed to be a flat surface, and a holding unit which holds an object is provided on a part opposite to the flat surface.

With this structure, when the two-legged walking or the four-legged walking is performed as the moving form, the flat surface can be grounded. Therefore, the stability at the time of moving can be increased. Also, since the holding unit can hold the object, the mobile robot can work by using the holding unit.

According to still another aspect of the present invention, a front end tool which is to be attached to a mobile robot having a plurality of kinds of different moving forms, includes a body unit and a plurality of limb units of which a base end side is connected to the body unit. A part to be grounded is formed to be a flat surface, and the limb unit is connected to a part opposite to the flat surface, a locking groove which is locked to a bar-shaped member and a hook groove which is hooked to the bar-shaped member are formed in parallel on the flat surface, a part on the flat surface on the side of the hook groove is formed to be branched into two parts on both sides of a space, and a holding unit which holds an object is provided to be stored in the space.

With this structure, when the two-legged walking or the four-legged walking is performed as the moving form, the flat surface can be grounded. Therefore, the stability at the time of moving can be increased. Also, when the mobile robot climbs up/down the ladder as the moving form, the locking grooves of the front end tools attached to the two limb units on the lower side can be locked to the rung of the ladder, and the hook grooves of the front end tools attached to the two limb units on the upper side can be hooked to the rung or the support of the ladder. Therefore, the mobile robot can preferably climb up/down the ladder. In addition, since the holding unit can hold the object, the mobile robot can work by using the holding unit. At this time, the holding unit can be stored in the space, the mobile robot can climb up/down the ladder without being blocked by the holding unit.

Advantageously, in the front end tool, an image pickup device is provided.

With this structure, an environment around the front end tool can be visually recognized by an image imaged by the image pickup device.

Advantageously, the front end tool further includes: a connection part configured to be connected to the limb unit; a toe part configured to be provided on one side across the connection part; and a heel part configured to be provided on the other side across the connection part. A part of the toe part which is grounded at the time of standing on tiptoe and moving is a curved surface.

With this structure, a part to be the curved surface of the toe part of the front end tool can be surely grounded, for example, even when the drive of a part of a plurality of drive shafts of the limb unit is stopped at the time of the four-legged walking. Therefore, since the drive of a part of the drive shafts can be stopped, power consumption can be reduced.

DESCRIPTION OF EMBODIMENTS

Embodiments according to the present invention will be described in detail below with reference to the drawings. The present invention is not limited to the embodiments. Also, components of the embodiments below include components which can be switched and easily used by those skilled in the art and components which are substantially same as those of the embodiments. In addition, the components described below can be appropriately combined with each other. Also, when there are a plurality of embodiments, the embodiments can be combined with each other.

First Embodiment

Figure 1:
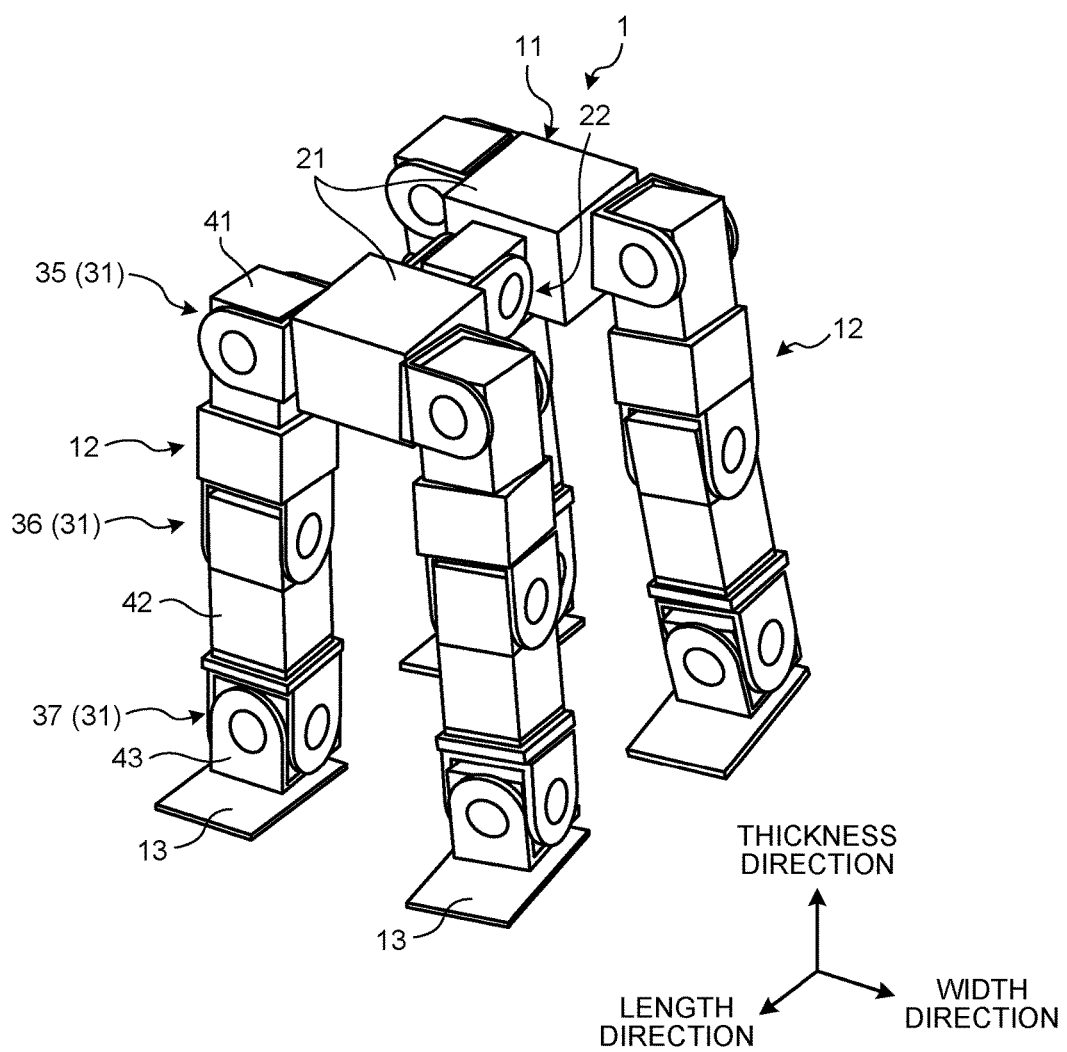
FIG. 1 is an external perspective view of a mobile robot according to a first embodiment.
Figure 2:
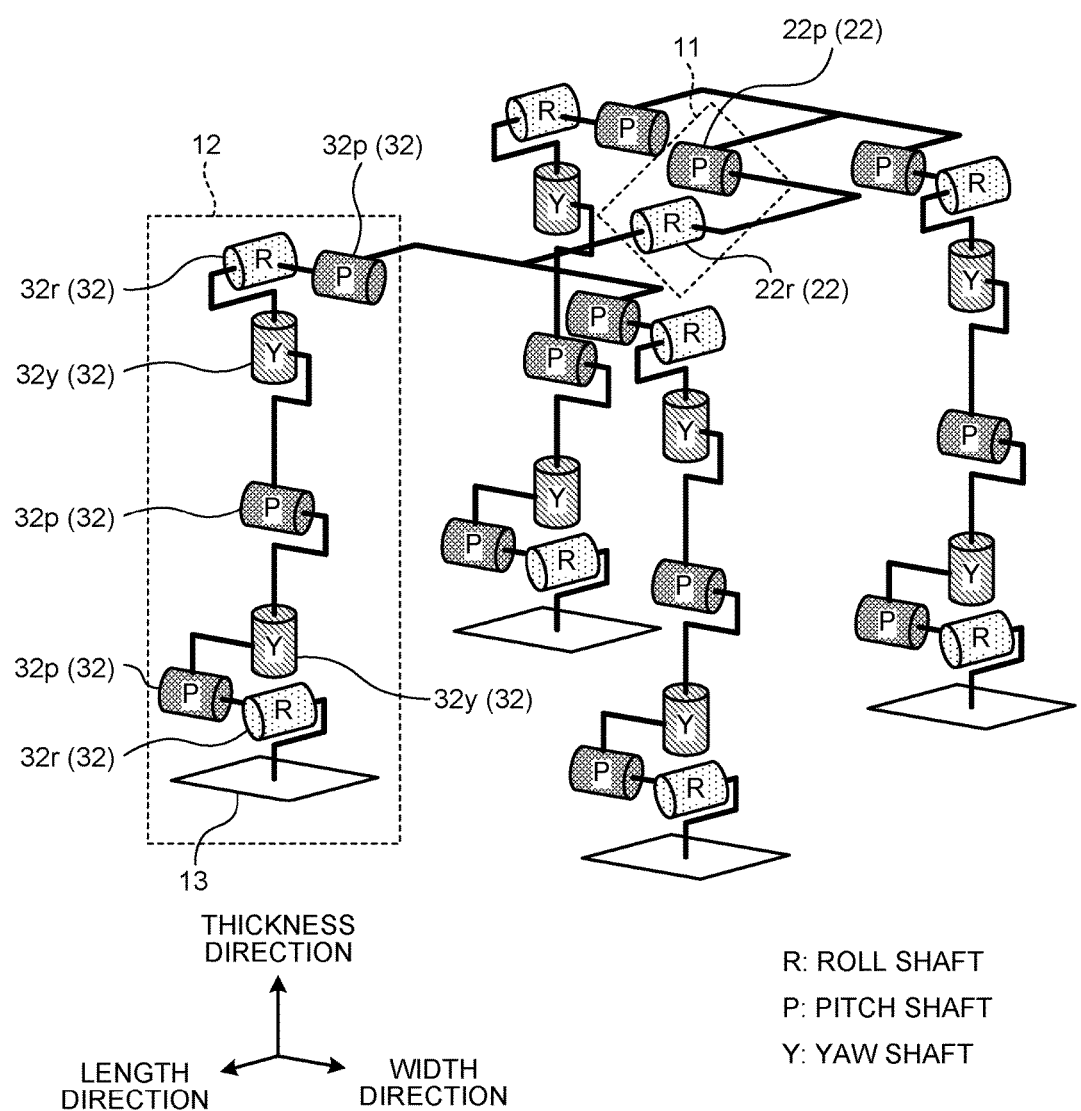
FIG. 2 is a configuration diagram of drive shafts provided in the mobile robot according to the first embodiment.
Figure 3:
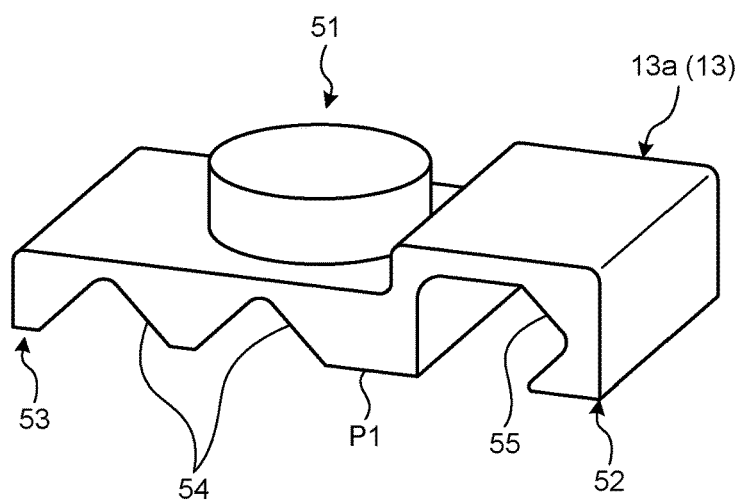
FIG. 3 is an external perspective view of an exemplary front end tool to be attached to the mobile robot according to the first embodiment.
Figure 4:
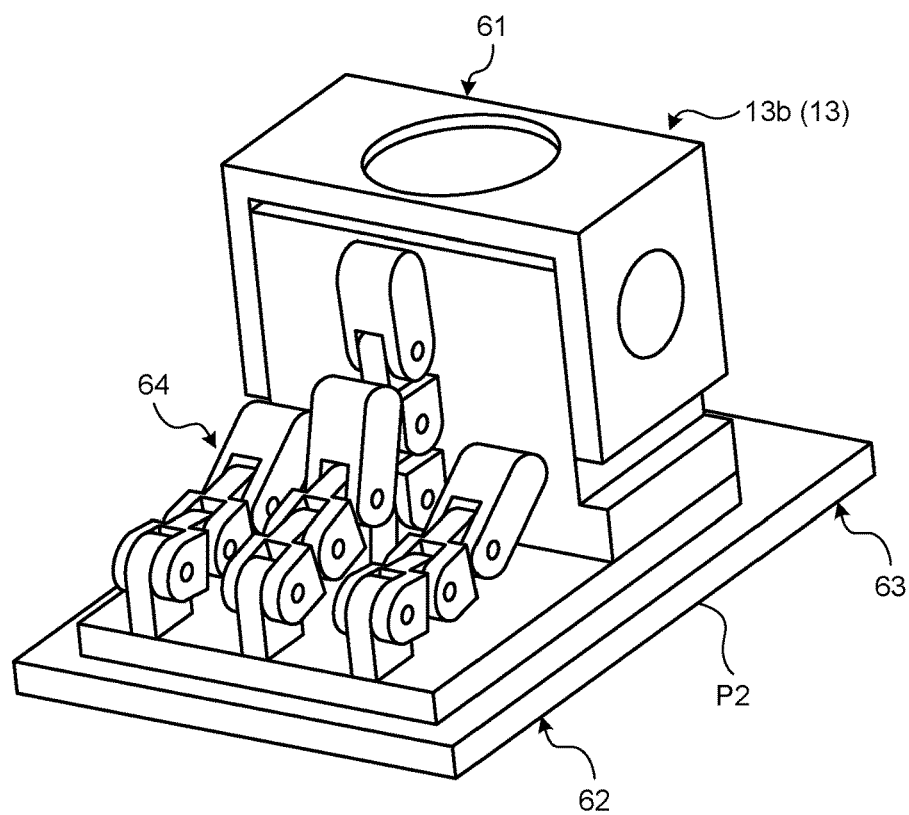
FIG. 4 is an external perspective view of an exemplary front end tool to be attached to the mobile robot according to the first embodiment.

FIG. 1 is an external perspective view of a mobile robot according to a first embodiment. FIG. 2 is a configuration diagram of drive shafts provided in the mobile robot according to the first embodiment. FIG. 3 is an external perspective view of an exemplary front end tool to be attached to the mobile robot according to the first embodiment. FIG. 4 is an external perspective view of an exemplary front end tool to be attached to the mobile robot according to the first embodiment.

A mobile robot 1 illustrated in FIG. 1 has a plurality of kinds of different moving forms. As the moving form, for example, two-legged walking, three-legged walking, four-legged walking, climbing up/down a ladder, and moving on its stomach can be performed. The mobile robot 1 moves to a predetermined moving destination in a moving form according to a moving environment.

As illustrated FIG. 1, the mobile robot 1 includes a body unit 11, four limb units 12, and four front end tools 13.

The body unit 11 is formed in a substantially rectangular shape having a front face, a back face, a top surface, a bottom surface, a left side face, and a right side face. Here, it is assumed that a direction to which the front face and the back face of the body unit 11 are opposed be a thickness direction. Also, it is assumed that a direction which is perpendicular to the thickness direction and to which the top surface and the bottom surface of the body unit 11 are opposed be a length direction. In addition, it is assumed that a direction perpendicular to the thickness direction and the length direction be a width direction. The body unit 11 includes two body frames 21 and two body-side drive shafts 22. The two body frames 21 are aligned and provided in the length direction, and the two body-side drive shafts 22 are provided between the two body frames 21.

In each body frame 21, the left side face and the right side face are respectively connected to single limb units 12. Also, each body frame 21 has almost the same structure.

The two body-side drive shafts 22 illustrated in FIG. 2 include pitch shafts 22$p$ and roll shafts 22$r$. The two body-side drive shafts 22 have the same structure. Here, the roll shaft 22$r$ rotates around the length direction of the body unit 11. Also, the pitch shaft 22$p$ rotates around the width direction of the body unit 11. In addition, a yaw shaft to be described rotates around the thickness direction of the body unit 11.

The pitch shaft 22$p$ drives the body unit 11 so as to fold it. Specifically, the pitch shaft 22$p$ rotationally drives the two body frames 21 so that the length direction of one of the two body frames 21 and the length direction of another body frame 21 form a predetermine angle. Here, for example, the pitch shaft 22$p$ can rotate 180°. Therefore, an angle in which the body unit 11 is bent forward to side of the front face is 90°. That is, the body unit 11 is rotationally driven so that the length direction of the one body frame 21 and the length direction of another body frame 21 form 90° on the side of the front face. Also, an angle in which the body unit 11 is bent backward to the side of the back face is 90°. That is, the body unit 11 is rotationally driven so that the length direction of the one body frame 21 and the length direction of the another body frame 21 form 90° on the side of the back face.

The roll shaft 22$r$ drives the body unit 11 to twist it. Specifically, the roll shaft 22$r$ rotationally drives the two body frames 21 so that the width direction of one body frame 21 and the width direction of another body frame 21 form a predetermined angle. Here, for example, the roll shaft 22r can rotate 180° similarly to the pitch shaft 22p. Therefore, in the surface perpendicular to the length direction of the body unit 11, a twisting angle of one body frame 21 relative to another body frame 21 is ±90°. That is, the body unit 11 is rotationally driven so that an angle between the width direction of the one body frame 21 and the width direction of the another body frame 21 becomes ±90°.

In the first embodiment, two body-side drive shafts 22 provided between two body frames 21 are provided. However, the structure is not limited to this, and the body-side drive shafts 22 may be appropriately provided according to the moving environment where the mobile robot 1 is used.

Regarding four limb units 12, two limb units 12 are respectively attached to the left side face and the right side face of the body unit 11. Specifically, as described above, the two limb units 12 are respectively connected to the left side face and the right side face of one body frame 21, and the other two limb units 12 are respectively connected to the left side face and the right side face of the another body frame 21. The four limb units 12 have the same structure. Next, the limb units 12 will be described. Since the four limb units 12 have the same structure, one limb unit 12 will be described below, and the description on the other three limb units 12 will be omitted. Also, the four limb units 12 are used in the first embodiment. However, it is preferable that the number of the limb units 12 be plural, and the number is not limited to this.

A base end part of the limb unit 12 is attached to the body unit 11, and the front end tool 13 is attached to a front end part of the limb unit 12. Therefore, a front end side of the limb unit 12 is grounded. The limb unit 12 has a plurality of kinds of different joint modules 31 and is formed by coupling the plurality of kinds of different joint modules 31 with each other. Also, the limb unit 12 includes a plurality of limb-side drive shafts 32, and one or more limb-side drive shafts 32 are arranged in each joint module 31.

The plurality of kinds of joint modules 31 includes a base end joint module 35, an intermediate joint module 36, and a front end joint module 37 in an order from the base end side of the limb unit 12.

The base end joint module 35 includes two limb-side drive shafts 32 and a holding frame 41 for holding the two limb-side drive shafts 32. Each of the two limb-side drive shafts 32 includes the pitch shaft 32p and the roll shaft 32r in an order from the base end side of the limb unit 12. Here, a pitch direction of the pitch shaft 32p, a roll direction of the roll shaft 32r, and a yaw direction of the yaw shaft 32y to be described are directions to be defined when the limb unit 12 is stretched along the thickness direction of the body unit 11.

The pitch shaft 32p drives the limb unit 12 so as to rotate it relative to the body unit 11. That is, the pitch shaft 32p rotationally drives the limb unit 12 having the width direction as an axis direction in the surfaces of the left side face and the right side face of the body unit 11.

The roll shaft 32r drives the limb unit 12 so that the front end part of the limb unit 12 rotates relative to the base end part of the limb unit 12. That is, the roll shaft 32r rotationally drives a part of the limb unit 12 on the front end side having the length direction as the axis direction in the surfaces of the top surface and the bottom surface of the body unit 11.

The intermediate joint module 36 illustrated in FIG. 1 includes three limb-side drive shafts 32 and a holding frame 42 for holding them. The three limb-side drive shafts 32 include the yaw shaft 32y, the pitch shaft 32p, and the yaw shaft 32y in an order from the base end side of the limb unit 12 as illustrated in FIG. 2.

The yaw shaft 32y of the intermediate joint module 36 rotates the front end part of the limb unit 12 relative to the base end part of the limb unit 12 having a direction to which the limb unit 12 is stretched as the axis direction. One of the two yaw shafts 32y is a redundant shaft.

The pitch shaft 32p of the intermediate joint module 36 rotates the limb unit 12 so as to fold the front end part of the limb unit 12 relative to the base end part of the limb unit 12 in a direction to which the limb unit 12 is stretched.

The front end joint module 37 includes two limb-side drive shafts 32 and a holding frame 43 for holding them. Each of the two limb-side drive shafts 32 includes the pitch shaft 32p and the roll shaft 32r in an order from the base end side of the limb unit 12. Since the front end joint module 37 has a similar structure to that of the base end joint module 35, the description will be omitted.

Since the limb unit 12 formed in this way has seven limb-side drive shafts 32 in total, the limb unit 12 has seven degrees of freedom. That is, the limb unit 12 has the limb-side drive shafts 32 in the pitch direction, the roll direction, the yaw direction, the pitch direction, the yaw direction, the pitch direction, and the roll direction in an order from the base end part side. The limb unit 12 has seven degrees of freedom in the first embodiment. However, it is preferable that the limb unit 12 have at least seven degrees of freedom, and the limb unit 12 may have equal to or more than seven degrees of freedom.

The four front end tools 13 are respectively removable relative to the four limb units 12, and a plurality of kinds of front end tools is prepared according to a use environment. Since the four front end tools 13 have the same structure, one front end tool 13 will be described below, and the description on the other three front end tools 13 will be omitted. The front end tool 13 is also called an end effector. A front end tool 13a which is one of the plurality of kinds of front end tools 13 is described in FIG. 3, and a front end tool 13b which is another kind of the plurality of kinds of front end tools 13 is described in FIG. 4.

The front end tool 13a illustrated in FIG. 3 is mainly used when the mobile robot 1 performs the two-legged walking and the four-legged walking and climbs up/down the ladder. The front end tool 13a includes a connection part 51 removably attached to the limb unit 12, a toe part 52 provided on one side across the connection part 51, and a heel part 53 provided on the other side across the connection part 51. In the front end tool 13a, a part opposite to an attached side to the limb unit 12 is grounded, and a flat surface P1 is formed on the part to be grounded.

In the flat surface P1, locking grooves 54 and a hook groove 55 are formed. The locking grooves 54 can be locked to the rung of the ladder, and the hook groove 55 can be hooked to the rung or a support (bar-shaped member) of the ladder. The locking grooves 54 are formed and extended to a direction perpendicular to a direction of the connection between the toe part 52 and the heel part 53 in the flat surface P1. The two locking grooves 54 are formed and arranged in the direction of the connection between the toe part 52 and the heel part 53, and the two locking grooves 54 are formed in parallel. One of the two locking grooves 54 is formed at the position of the connection part 51, and another locking groove 54 is formed at the position of the heel part 53. The hook groove 55 is formed and extended to a direction perpendicular to a direction of the connection between the toe part 52 and the heel part 53 in the flat surface P1. That is, the hook groove 55 is formed in parallel to the two locking grooves 54. The hook groove 55 is formed at the position of the toe part 52. The hook groove 55 is formed on the flat surface P1 (bottom surface) of the toe part 52 in the first embodiment. However, the hook groove 55 can be provided on the top surface of the heel part 53.

The front end tool 13b illustrated in FIG. 4 is mainly used when the mobile robot 1 performs the two-legged walking or the four-legged walking and performs various works. The front end tool 13b includes a connection part 61 removably attached to the limb unit 12, a toe part 62 provided on one side across the connection part 61, and a heel part 63 provided on the other side across the connection part 61. In the front end tool 13b, a part opposite to an attached side to the limb unit 12 is grounded, and a flat surface P2 is formed on the part to be grounded.

Also, in the front end tool 13b, a holding unit 64 which can hold an object is provided on the toe part 62 which is the opposite side of the flat surface P2. The holding unit 64 includes a plurality of fingers. The plurality of fingers is stretched at the time of working, and on the other hand, the plurality of fingers is folded at the time of walking.

The mobile robot 1 formed in this way, more specifically, the body unit 11 and the four limb units 12 can perform the moving operations below. The moving operation of the front face side and the moving operation on the back face side are symmetrical across the center in the thickness direction. Also, the body unit 11 and the four limb units 12 can perform the moving operations, and the moving operation on the top surface side and the moving operation on the bottom surface are symmetrical across the center in the length direction. In addition, the body unit 11 and the four limb units 12 can perform the moving operations below. The moving operation on the left side face side and the moving operation on the right side face are symmetrical across the center in the width direction.

The movement of the mobile robot 1 is controlled by a control device which is not shown. Specifically, the control device controls the movement by controlling the rotation drives of the above-mentioned drive shafts 22 and 32 provided in the mobile robot 1. Here, the movement of the mobile robot 1 may be autonomously controlled and controlled according to a remote operation by an operator. Also, these controls may be combined to control the movement of the mobile robot 1. In the first embodiment, when the movement of the mobile robot 1 is controlled, the operator recognizes the moving environment and selects the moving form of the mobile robot 1 according to the recognized moving environment. Then, the operator specifies the moving destination. After that, the mobile robot 1 moves based on the selected moving form and specified moving destination.

Figure 5:
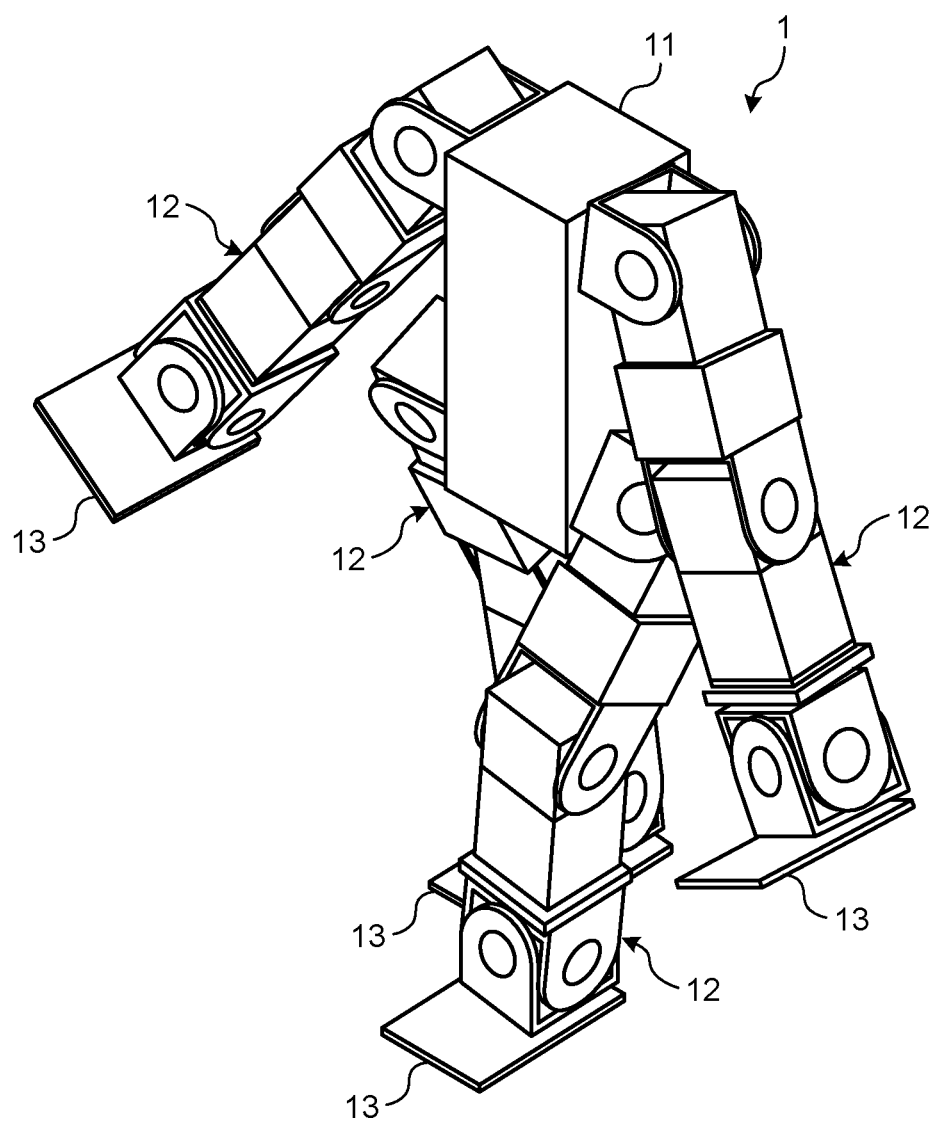
FIG. 5 is an explanatory diagram of a two-legged walking mode of the mobile robot according to the first embodiment.
Figure 6:
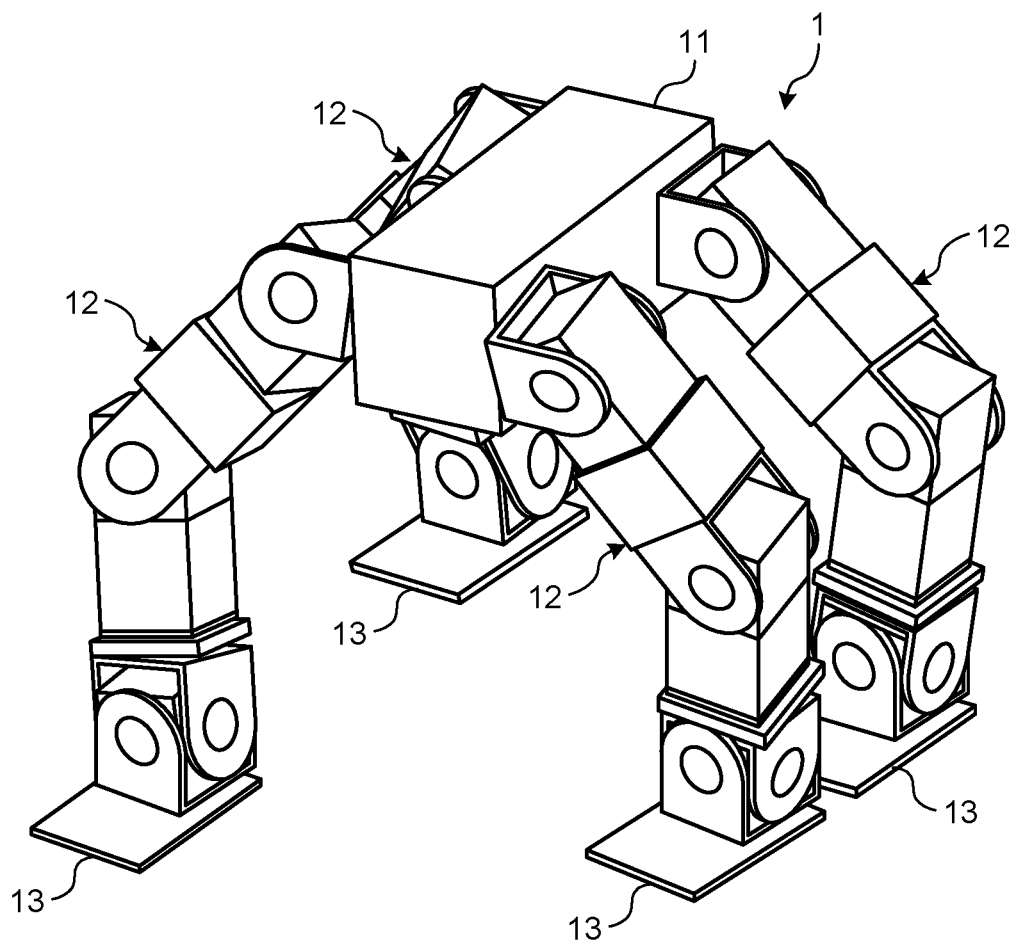
FIG. 6 is an explanatory diagram of a four-legged walking mode of the mobile robot according to the first embodiment.
Figure 7:
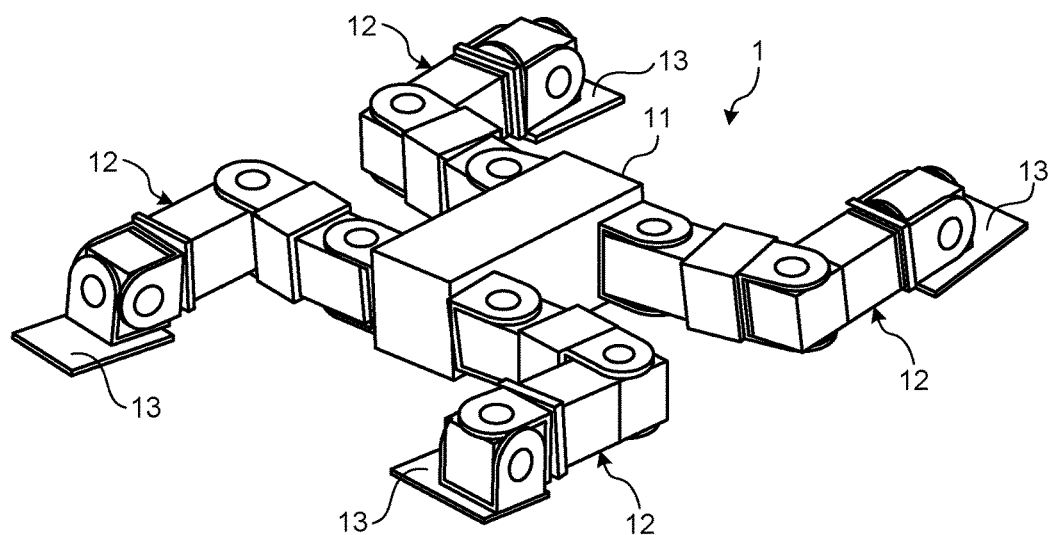
FIG. 7 is an explanatory diagram of a mode for moving on its stomach of the mobile robot according to the first embodiment.
Figure 8:
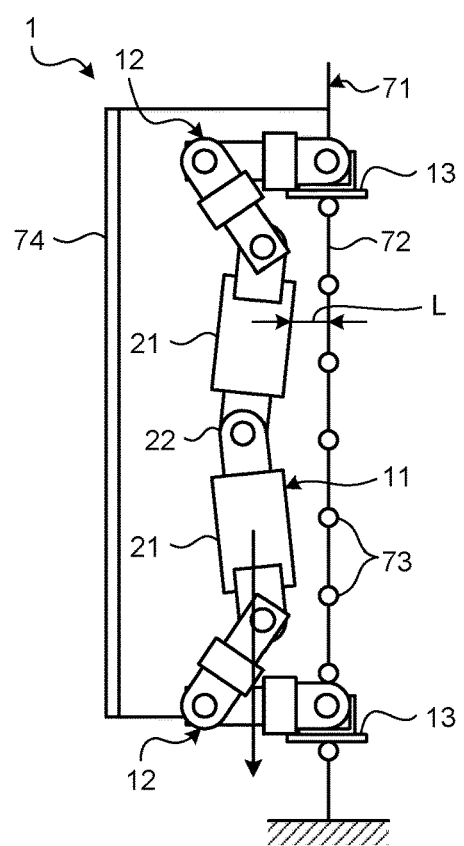
FIG. 8 is an explanatory diagram of an exemplary mode for climbing up/down a ladder of the mobile robot according to the first embodiment.
Figure 9:
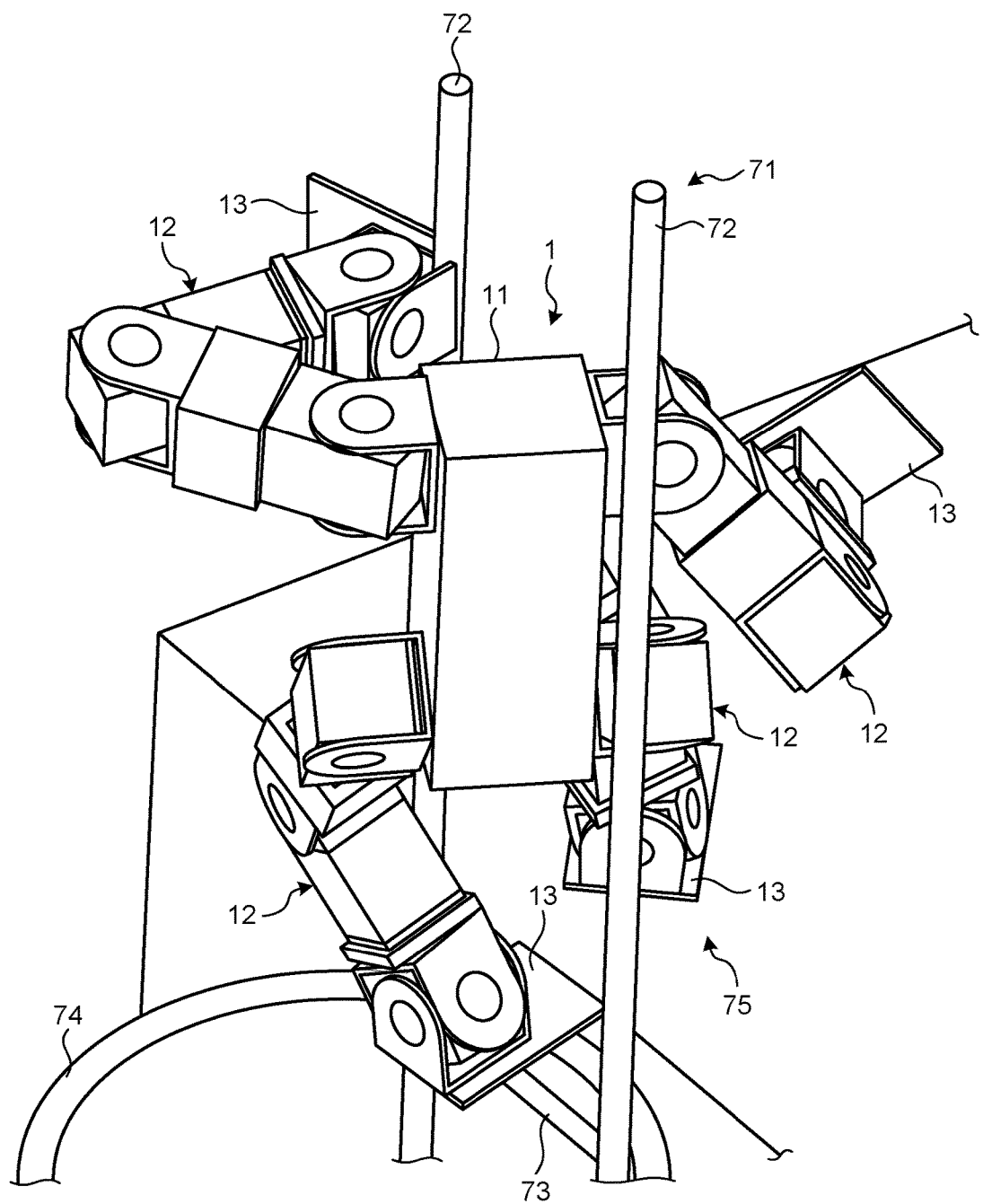
FIG. 9 is an explanatory diagram of an exemplary mode for climbing up/down a ladder of the mobile robot according to the first embodiment.
Figure 10:
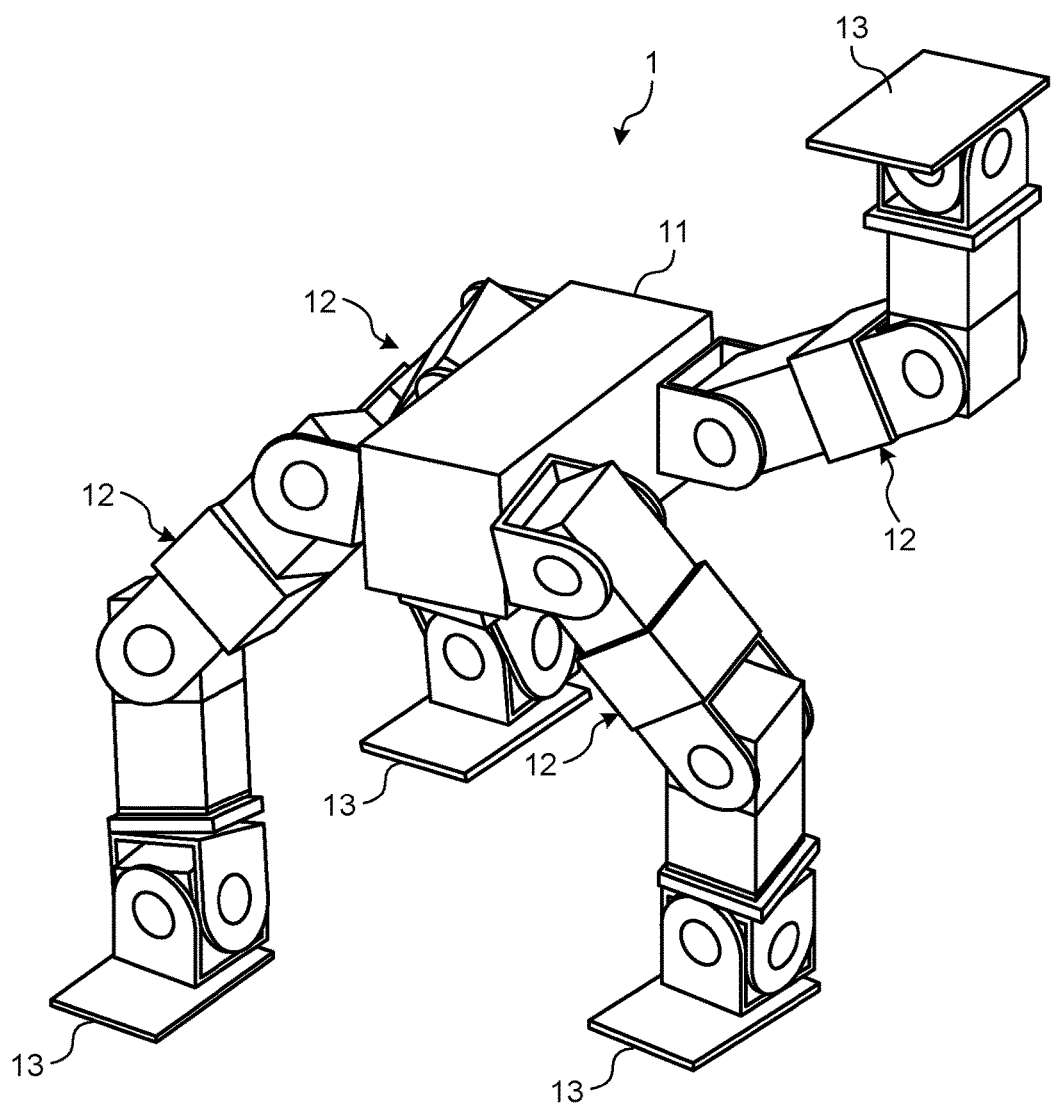
FIG. 10 is an explanatory diagram of an exemplary three-legged walking mode of the mobile robot according to the first embodiment.

Here, the mobile robot 1 of which the movement is controlled has a plurality of moving modes according to the plurality of kinds of different moving forms as illustrated in FIGS. 5 to 10. FIG. 5 is an explanatory diagram of a two-legged walking mode of the mobile robot according to the first embodiment. FIG. 6 is an explanatory diagram of a four-legged walking mode of the mobile robot according to the first embodiment. FIG. 7 is an explanatory diagram of a mode for moving on its stomach of the mobile robot according to the first embodiment. FIG. 8 is an explanatory diagram of an exemplary mode for climbing up/down the ladder of the mobile robot according to the first embodiment. FIG. 9 is an explanatory diagram of an exemplary mode for climbing up/down the ladder of the mobile robot according to the first embodiment. FIG. 10 is an explanatory diagram of an exemplary three-legged walking mode of the mobile robot according to the first embodiment. The plurality of moving modes includes the two-legged walking mode, the three-legged walking mode, the four-legged walking mode, the mode for climbing up/down the ladder, and the mode for moving on its stomach.

As illustrated in FIG. 5, in the two-legged walking mode, the mobile robot 1 makes the two limb units 12 positioned on the lower side function as the legs and makes the two limb units 12 positioned on the upper side function as arms while assuming that the length direction of the body unit 11 is the vertical direction.

As illustrated in FIG. 6, in the four-legged walking mode, the mobile robot 1 makes the four limb units 12 function as legs while assuming that the thickness direction of the body unit 11 is the vertical direction. In the four-legged walking mode, a body grounding four-legged walking mode may be performed. In the body grounding four-legged walking mode, the mobile robot 1 moves in a state where a part of the body unit 11 is grounded.

As illustrated in FIG. 7, in the mode for moving on its stomach, the mobile robot 1 makes the four limb units 12 function as the legs while assuming that the thickness direction of the body unit 11 is the vertical direction. Here, each of the base end joint modules 35 of the four limb units 12 includes the roll shaft 32r and the pitch shaft 32p. Therefore, the four limb units 12 can perform an operation along the surfaces of the front face and the back face of the body unit 11. Also, each of the front end joint modules 37 of the four limb units 12 includes the roll shaft 32r and the pitch shaft 32p. Therefore, the four limb units 12 can perform the operations respectively along the flat surfaces P1 and P2 of the front end tool 13. Accordingly, in the mode for moving on its stomach, the mobile robot 1 can prevent the increase in the height in the vertical direction and can move in a state where the mobile robot 1 crawls on the ground.

As illustrated in FIGS. 8 and 9, in the mode for climbing up/down the ladder, the mobile robot 1 makes the two limb units 12 positioned on the lower side function as the legs and makes the two limb units 12 positioned on the upper side function as arms while assuming that the length direction of the body unit 11 is the vertical direction. Here, a ladder 71 includes two supports 72 which extends in the vertical direction and is arranged in parallel, a plurality of rungs 73 which connects the two supports 72 with each other and extends in the horizontal direction, and a protection fence 74 to protect a user who uses the ladder 71. The protection fence 74 is formed in a cylindrical shape, and an inside of the protection fence 74 is a passage of the user or the mobile robot 1.

The mobile robot 1 uses the front end tool 13a illustrated in FIG. 3 as the front end tool 13 in the mode for climbing up/down the ladder. The mobile robot 1 locks the locking grooves 54 of the front end tools 13a attached to the two limb units 12 for functioning as the legs to the rung 73 of the ladder 71. Also, the mobile robot 1 hooks the hook grooves 55 of the front end tools 13a attached to the two limb units 12 for functioning as the arms to the rung 73 of the ladder 71. In this state, the mobile robot 1 climbs up/down the ladder 71 by climbing up/down the rung 73 of the ladder 71 step by step by alternately operating two limb units 12 for functioning as the legs and by climbing up/down the rung 73 of the ladder 71 step by step by alternately operating the two limb units 12 for functioning as the arms. Here, since the body unit 11 includes the pitch shaft 22p, the mobile robot 1 climbs up/down the ladder 71 in a state where a surface on the side of the ladder 71 of the body unit 11 is bent forward.

When the body unit 11 is bent forward, the base end parts of the four limb units 12 get closer to the side of the ladder 71. Therefore, a distance L between the mobile robot 1 and the ladder 71 can be shortened by moving the whole mobile robot 1 toward the ladder 71, and the mobile robot 1 can climb up/down the ladder 71 in a state of being stored in the protection fence 74.

As illustrated in FIG. 9, when the mobile robot 1 finishes climbing up the ladder 71, the limb unit 12 has two yaw shafts 32y. Therefore, in a state where the two limb units 12 to be one leg or arm are fixed to the ladder 71, the mobile robot 1 drives the yaw shaft 32y of the fixed one leg. Accordingly, the mobile robot 1 can rotate the body unit 11 so that the limb unit 12 which is one leg to be free is grounded at a landing point 75 apart from the ladder 71. In this way, the mobile robot 1 can not only climb up/down the ladder 71 but also finish climbing up the ladder 71 in the mode for climbing up/down the ladder.

As illustrated in FIG. 10, in the three-legged walking mode, the mobile robot 1 makes the three limb units 12 function as the legs and makes the other one limb unit 12 function as a manipulator for work while assuming that the thickness direction of the body unit 11 is the vertical direction. Therefore, the mobile robot 1 can walk by controlling the movements of the three limb units 12 for functioning as the legs and work by using the single limb unit 12. In the three-legged walking mode, a body grounding three-legged walking mode may be performed. In the body grounding three-legged walking mode, the mobile robot 1 moves in a state where a part of the body unit 11 is grounded.

Figure 11:
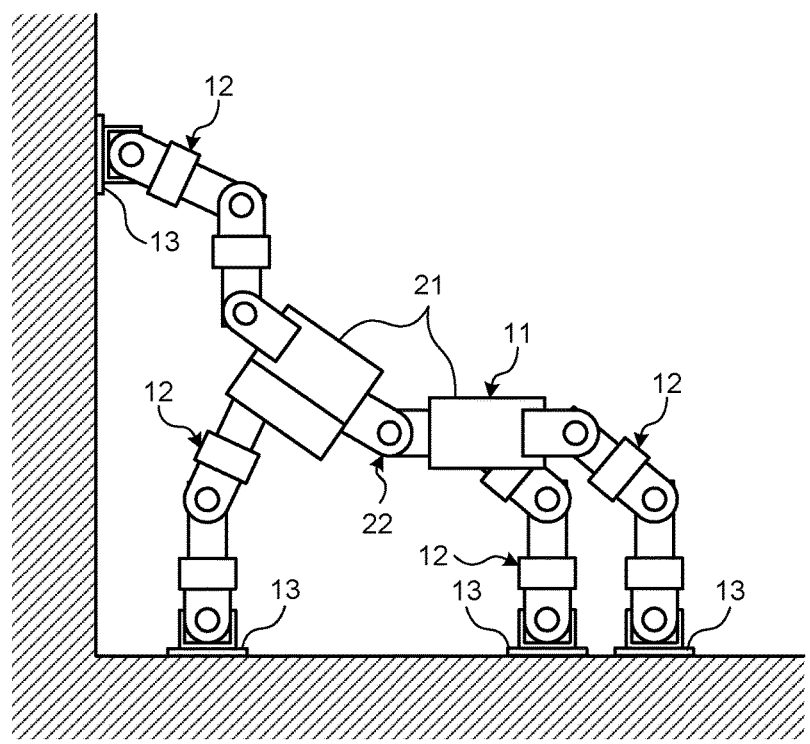
FIG. 11 is an explanatory diagram of an exemplary three-legged supporting and working mode of the mobile robot according to the first embodiment.

Also, as illustrated in FIG. 11, the mobile robot 1 performs the work to a high place by supporting itself by using three limb units 12 as the legs and performing the three-legged supporting and working mode in which one limb unit 12 is functioned as the manipulator for work. FIG. 11 is an explanatory diagram of an exemplary three-legged supporting and working mode of the mobile robot according to the first embodiment. The mobile robot 1 has the pitch shaft 22p and the roll shaft 22r provided in the body unit 11. Therefore, the mobile robot 1 can bend the body unit 11 backward by driving the pitch shaft 22p in the three-legged supporting and working mode. Also, the mobile robot 1 can twist the body unit 11 by driving the roll shaft 22r. Therefore, since the base end part of the single limb unit 12 for functioning as the manipulator can be positioned on the upper side in the vertical direction, the mobile robot 1 can perform the work to the high place.

Figure 12:
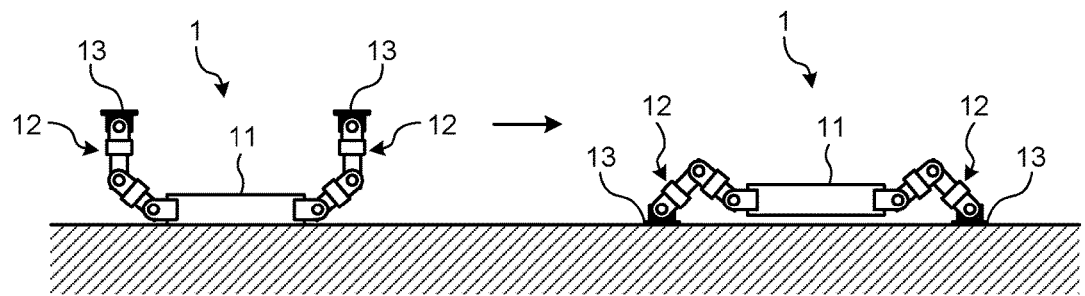
FIG. 12 is an explanatory diagram of an exemplary return operation mode of the mobile robot according to the first embodiment.

Also, as illustrated in FIG. 12, the mobile robot 1 can perform the return operation mode in which the mobile robot 1 returns to the original moving mode at the time of falling down. FIG. 12 is an explanatory diagram of an exemplary return operation mode of the mobile robot according to the first embodiment. At the time of falling down, in a state of lying on its back in which the front face of the mobile robot 1 comes on the upper side, the mobile robot 1 can change the above state to a state of lying on its stomach in which the front face of the mobile robot 1 comes on the lower side by switching the front face and the back face. Therefore, the mobile robot 1 can be returned to the original moving mode from the state of lying on its stomach. For example, when the original moving mode is the four-legged walking mode, the state of the mobile robot 1 can be changed from the state of lying on its stomach to the four-legged walking mode by holding the body unit 11 to the upper side in the vertical direction by the four limb units 12. Therefore, the mobile robot 1 can be promptly returned to the original mode.

Figure 13:
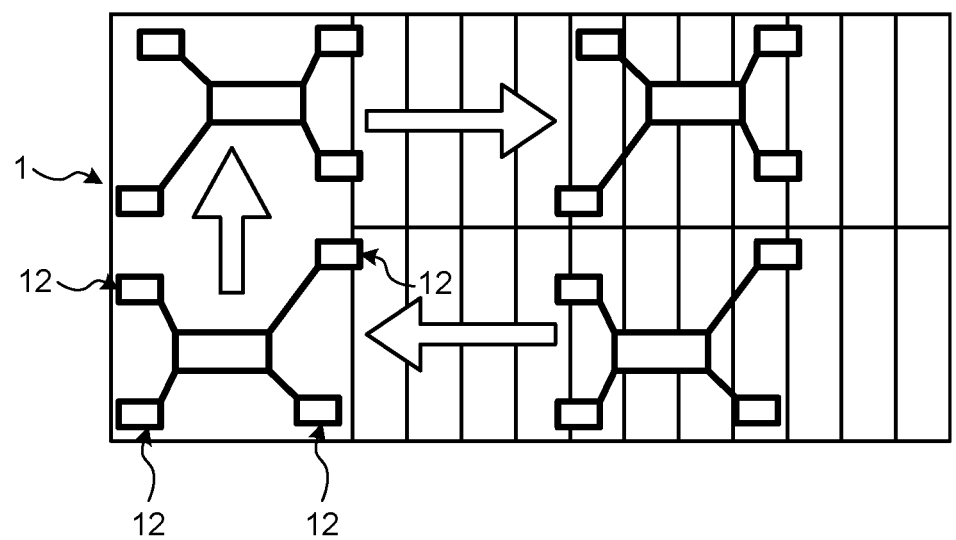
FIG. 13 is an explanatory diagram of an exemplary turning back movement at the time of the four-legged walking mode of the mobile robot according to the first embodiment.
Figure 14:
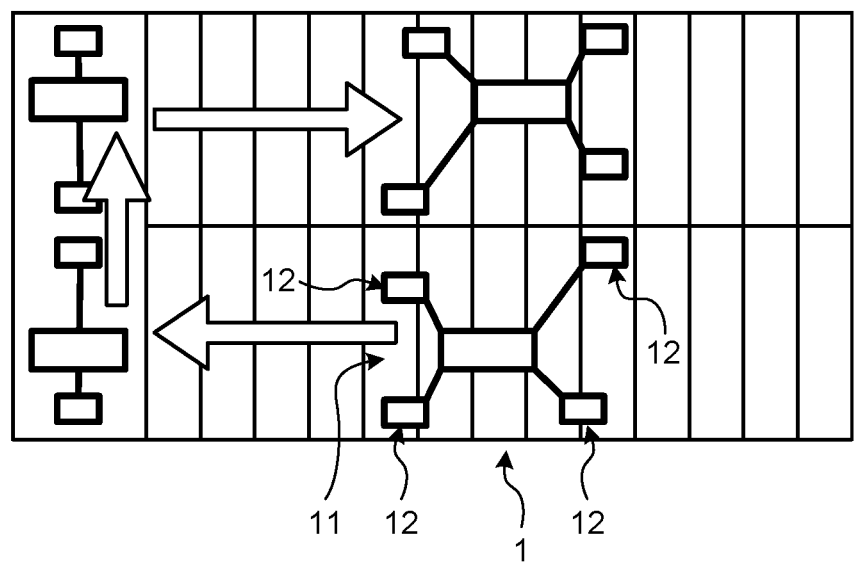
FIG. 14 is an explanatory diagram of an exemplary turning back movement at the time of the two-legged walking mode of the mobile robot according to the first embodiment.

Also, for example, the mobile robot 1 can perform the movements illustrated in FIGS. 13 and 14 by switching the front face and the back face or switching the top surface and the bottom surface. FIG. 13 is an explanatory diagram of an exemplary turning back movement at the time of the four-legged walking mode of the mobile robot according to the first embodiment. Also, FIG. 14 is an explanatory diagram of an exemplary turning back movement at the time of the two-legged walking mode of the mobile robot according to the first embodiment.

As illustrated in FIG. 13, a case will be described where the mobile robot 1 moves from stairs which extend in one direction to stairs which extend in the opposite direction via a landing. At this time, the mobile robot 1 is in the four-legged walking mode so as to stably move on the stairs. The mobile robot 1 in the four-legged walking mode moves on the stairs in one direction as the top surface side of the body unit 11 is faced to the front side. After that, the mobile robot 1 reaches the landing. The mobile robot 1 which has reached the landing moves on the landing from the stairs for extending in one direction to the stairs for extending in the opposite direction without changing the direction. After that, the mobile robot 1 can move on the stairs in the opposite direction as the top surface side of the body unit 11 is faced to the front side by switching the top surface and the bottom surface of the body unit 11.

Also, as illustrated in FIG. 14, a case will be described where the mobile robot 1 moves on the stairs which extend in one direction to the stairs which extend in the opposite direction via the landing. At this time, the mobile robot 1 is in the four-legged walking mode so as to stably move on the stairs. On the other hand, since the landing in FIG. 14 is narrower than that in FIG. 13, the mobile robot 1 is in the two-legged walking mode on the landing. The mobile robot 1 in the four-legged walking mode moves on the stairs in one direction as the top surface side of the body unit 11 is faced to the front side. After that, the mobile robot 1 reaches the landing. The mode of the mobile robot 1 which has reached the landing is switched to the two-legged walking mode. After that, the mobile robot 1 in the two-legged walking mode moves sideways on the landing from the stairs for extending in one direction to the stairs for extending in the opposite direction without changing the direction. After that, the mode of the mobile robot 1 is changed to the four-legged walking mode after the front face and the back face of the body unit 11 have been switched. Then, the mobile robot 1 can move the stairs in the opposite direction as the top surface side of the body unit 11 is faced to the front side.

As described above, according to the first embodiment, even when the mobile robot 1 falls down in the state of lying on its back in which the front face side of the body unit 11 comes on the upper side, the front face side and the back face side of the body unit 11 and the four limb units 12 can be switched. Therefore, the mobile robot 1 can be returned from the state of lying on its stomach in which the front face side of the body unit 11 comes on the lower side to the state before falling down by switching the front face side and the back face side. Accordingly, even when the mobile robot 1 moves by using the plurality of kinds of different moving forms, the return operation and the like can be smoothly performed by switching the front face side and the back face side. Therefore, the mobile robot 1 can preferably move.

Also, according to the first embodiment, even when the mobile robot 1 moves to the top surface side or the bottom surface side according to the moving form, the movement to the top surface side and the movement to the bottom surface side can be switched by switching the top surface side and the bottom surface side of the body unit 11 and the four limb units 12. Therefore, the mobile robot 1 can preferably move.

Also, according to the first embodiment, the limb units 12 are provided on the left side face and the right side face of the body unit 11, and the base end side of the limb unit 12 can be operated in the roll direction and the pitch direction relative to the body unit 11. Accordingly, a movable range of the limb unit 12 can be wider.

Also, according to the first embodiment, the front end side of the limb unit 12 can be operated in the roll direction and the pitch direction relative to the front end tool 13. Therefore, for example, the mode for moving on its stomach is performed as the moving form, the height of the mobile robot 1 is reduced and the mobile robot 1 can move on its stomach. The mobile robot 1 can pass through a narrow part where there is a limit in the height direction.

Also, according to the first embodiment, even when the moving environment is the irregular ground, the front end tool 13 can be preferably grounded to the irregular ground by operating the front end side in the yaw direction relative to the base end part of the limb unit 12. Therefore, the stability at the time of moving can be increased. Also, since one of two yaw shafts 32y is the redundant shaft, the mobile robot 1 can continuously walk even when one yaw shaft 32y has a failure, and the stability at the time of moving can be further increased.

Also, according to the first embodiment, the body unit 11 can be bent forward and backward by providing the pitch shaft 22p in the body unit 11. Also, the body unit 11 can be twisted by providing the roll shaft 22r in the body unit 11. Therefore, as the moving form, for example, when climbing up/down the ladder 71 as illustrated in FIG. 8, the body unit 11 can be bent forward relative to the ladder 71. Therefore, the base end part of the limb unit 12 can be moved closer to the side of the ladder 71. Accordingly, the mobile robot 1 can climb up/down the ladder 71 in the state where the distance from the ladder 71 to the body unit 11 is reduced. Even when the protection fence 74 is provided around the ladder 71, the mobile robot 1 can preferably climb up/down the ladder 71. Also, by providing the pitch shaft 22p and the roll shaft 22r in the body unit 11, the body unit 11 can be twisted in the state where the body unit 11 is bent backward in the three-legged supporting and working mode illustrated in FIG. 11. Therefore, the base end part of the limb unit 12 can be raised high.

Also, according to the first embodiment, the limb unit 12 can be easily assembled by forming the limb unit 12 by coupling a plurality of joint modules 31. Also, since each joint module 31 can be exchanged, the exchange operation when the limb unit 12 has a failure can be easier.

Also, according to the first embodiment, since the plurality of different kinds of joint modules 31 can use the same limb-side drive shaft 32, components can be used in common.

Also, according to the first embodiment, the front end tools 13 can be changed to the different kind of the same by removably attaching the front end tool 13 to the limb unit 12.

Also, according to the first embodiment, by using the front end tool 13a illustrated in FIG. 3, the flat surface P1 can be grounded when the two-legged walking or the four-legged walking is performed. Therefore, stability at the time of moving can be increased. Also, when the mobile robot 1 climbs up/down the ladder 71, the locking grooves 54 of the front end tools 13a to be attached to the two limb units 12 on the lower side can be locked to the rung 73 of the ladder 71, and the hook grooves 55 of the front end tools 13a to be attached to the two limb units 12 on the upper side can be hooked to the rung 73 or the support 72 of the ladder 71. Therefore, the mobile robot 1 can preferably climb up/down the ladder 71.

Also, according to the first embodiment, by using the front end tool 13b illustrated in FIG. 4, the flat surface P2 can be grounded when the two-legged walking or the four-legged walking is performed. Therefore, the stability at the time of moving can be increased. Also, since the holding unit 64 can hold the object, the mobile robot 1 can work by using the holding unit 64.

Second Embodiment

Figure 15:
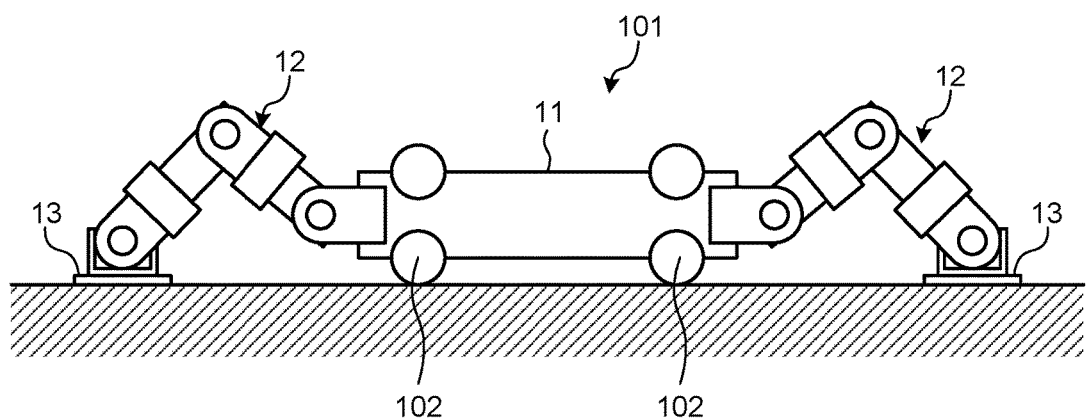
FIG. 15 is a side view of a mobile robot according to a second embodiment.

Next, a mobile robot 101 according to a second embodiment will be described with reference to FIG. 15. FIG. 15 is a side view of a mobile robot according to the second embodiment. In the second embodiment, in order to avoid the overlapped description, a part which is different from that of the first embodiment will be described. Parts which are similar to those of the first embodiment will be denoted with the same reference signs and described.

The mobile robot 101 according to the second embodiment has a plurality of wheels 102 attached on a left side face and a right side face of a body unit 11. Specifically, four each of the plurality of wheels 102 are arranged on the left side face and the right side face. In the four wheels 102 arranged on each side face, two wheels 102 are arranged on the side of the front face, and the other two wheels 102 are arranged on the side of the back face. The eight wheels 102 are arranged so that the positions of them are symmetrical in the thickness direction, the length direction, and the width direction of the body unit 11. Each wheel 102 can rotate around the width direction as an axis direction. The four wheels 102 on the side of the front face are arranged so as to project from the front face of the body unit 11. Similarly, the four wheels 102 of the side of the back face are arranged so as to project from the back face of the body unit 11.

As described above, according to the second embodiment, self-weight of the body unit 11 can be supported by moving the body unit 11 closer to the ground and grounding the wheels 102. Therefore, a load applied to the limb unit 11 can be reduced. Also, the body unit 11 can smoothly move by rolling the wheels 102. Providing the wheels 102 is particularly useful in the body grounding three-legged walking mode and the body grounding four-legged walking mode.

Third Embodiment

Figure 16:
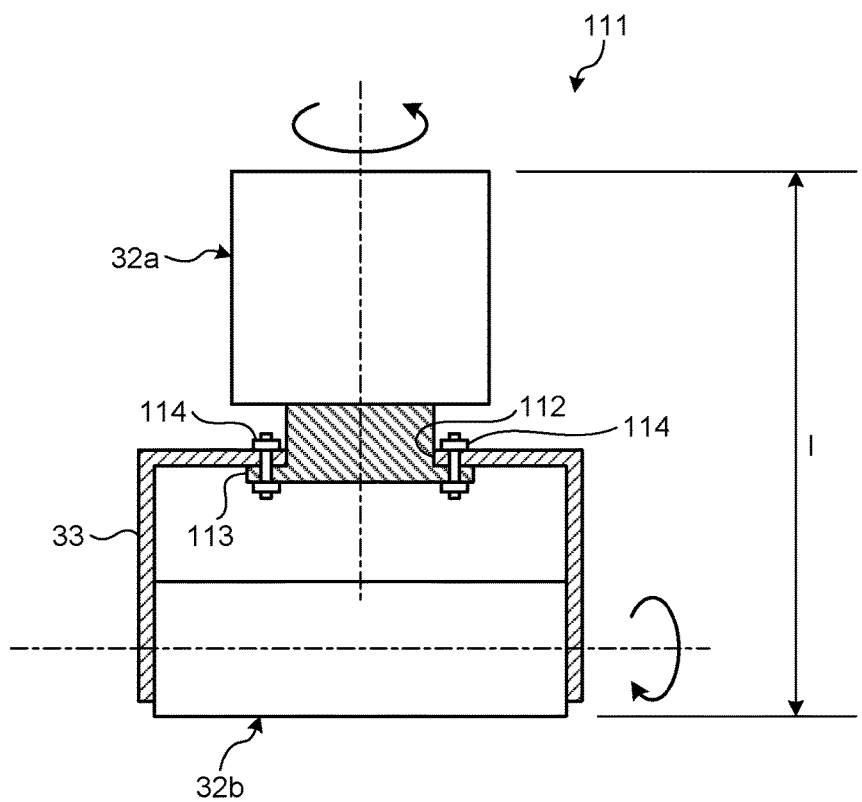
FIG. 16 is a sectional view of an exemplary connection between drive shafts in a mobile robot according to a third embodiment.
Figure 17:
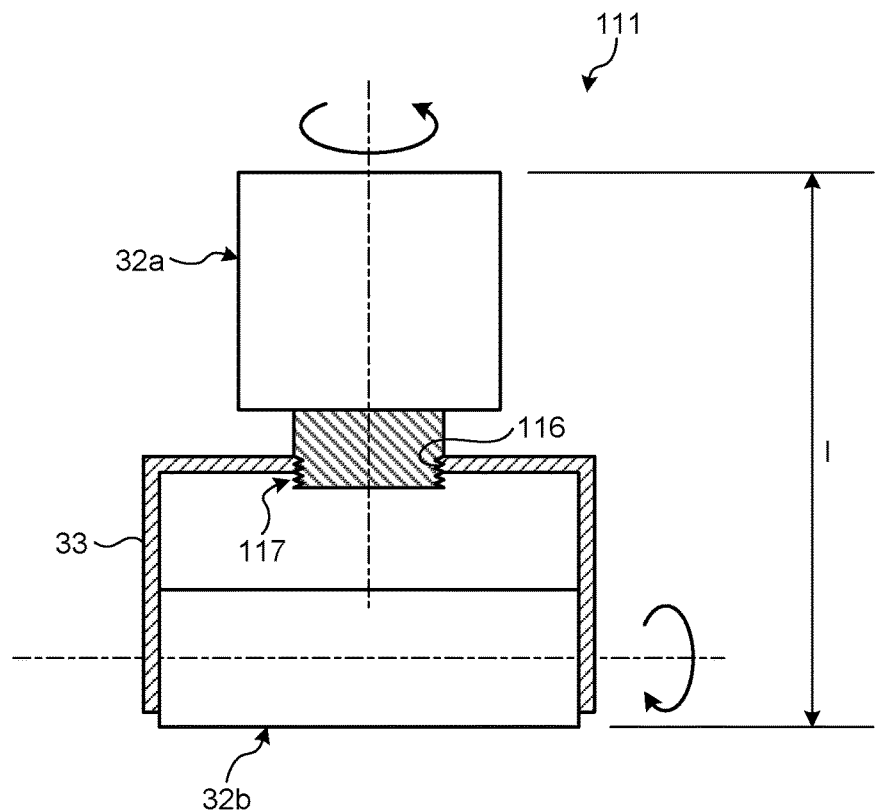
FIG. 17 is a sectional view of an exemplary connection between the drive shafts of the mobile robot according to the third embodiment.

Next, a mobile robot 111 according to a third embodiment will be described with reference to FIGS. 16 and 17. FIG. 16 is a sectional view of an exemplary connection between drive shafts of the mobile robot according to the third embodiment. FIG. 17 is a sectional view of an exemplary connection between drive shafts of the mobile robot according to the third embodiment. Also in the third embodiment, in order to avoid the overlapped description, parts which are different from those of the first and second embodiments will be described. Parts which are similar to those of the first and second embodiments will be denoted with the same reference signs and described.

In the mobile robot 111 according to the third embodiment, each limb unit 12 illustrated in FIG. 16 includes a predetermined first drive shaft 32a and a second drive shaft 32b from among a plurality of limb-side drive shafts 32. The second drive shaft 32b is inclined by a predetermined angle relative to the first drive shaft 32a. Here, the first drive shaft 32a and the second drive shaft 32b may be any one of the roll shaft 32*r*, the pitch shaft 32*p*, and the yaw shaft 32*y*. Also, the limb unit 12 has a holding frame 33 which holds the second drive shaft 32*b* therein and has the first drive shaft 32*a* attached outside of the same. Here, the holding frame 33 may be any one of the holding frame 41 of the base end joint module 35, the holding frame 42 of the intermediate joint module 36, and the holding frame 43 of the front end joint module 37.

A recess hole 112 is formed in the holding frame 33, and the recess hole 112 is recessed in the outer surface of the holding frame 33. One end of the first drive shaft 32*a* is stored in the recess hole 112. An annular flange 113 which projects outside in a radial direction is formed on the one end of the first drive shaft 32*a*. The first drive shaft 32*a* is fixed to the holding frame 33 by fastening the flange 113 and the periphery of the recess hole 112 with a fastening member 114.

Also, in holding frame 33 of the each limb unit 12 illustrated in FIG. 17, a female screw part 116 is formed to pass through the outer surface of the holding frame 33 by being recessed inward. One end of the first drive shaft 32*a* is stored in the female screw part 116. A male screw part 117 to be screwed with the female screw part 116 is formed in one end of the first drive shaft 32*a*. The first drive shaft 32*a* is fixed to the holding frame 33 by fastening the female screw part 116 with the male screw part 117.

As described above, according to the third embodiment, a length l including the first drive shaft 32*a* and the second drive shaft 32*b* can be shortened in the axis direction of the first drive shaft 32*a* by a length in which a part of the first drive shaft 32*a* can be stored in the recess hole 112 or the female screw part 116. Therefore, the size of the limb unit 12 can be reduced.

Fourth Embodiment

Figure 18:
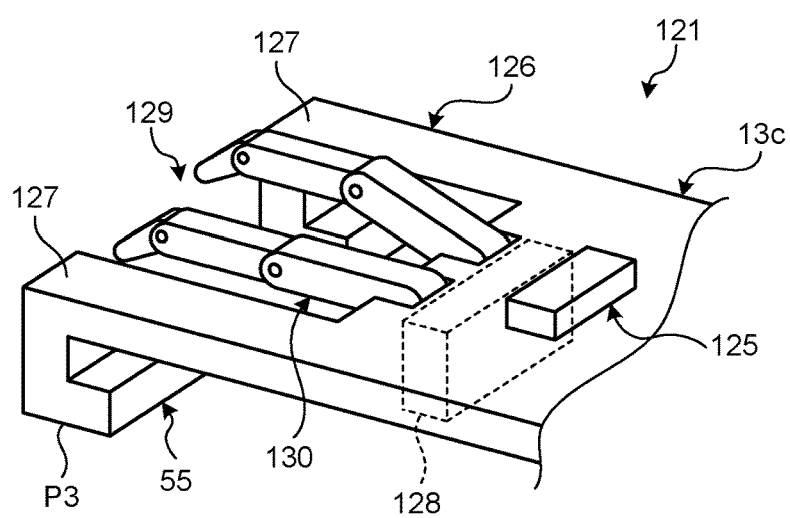
FIG. 18 is an external perspective view of an exemplary front end tool to be attached to a mobile robot according to a fourth embodiment.
Figure 19:
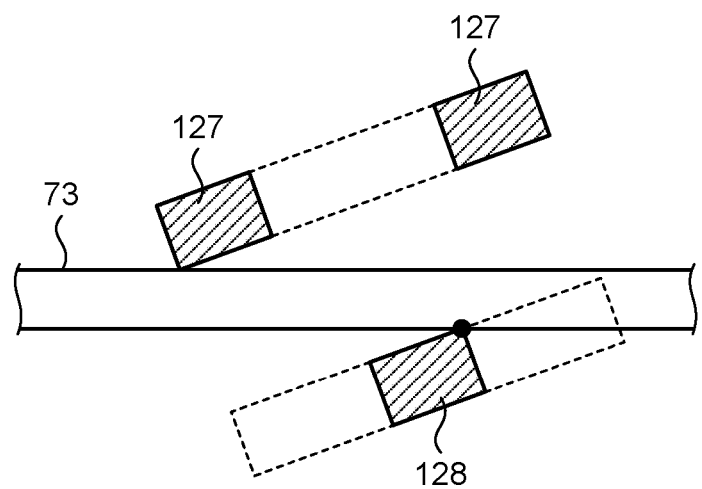
FIG. 19 is a sectional view of the front end tool to be hooked to a rung of the ladder.
Figure 20:
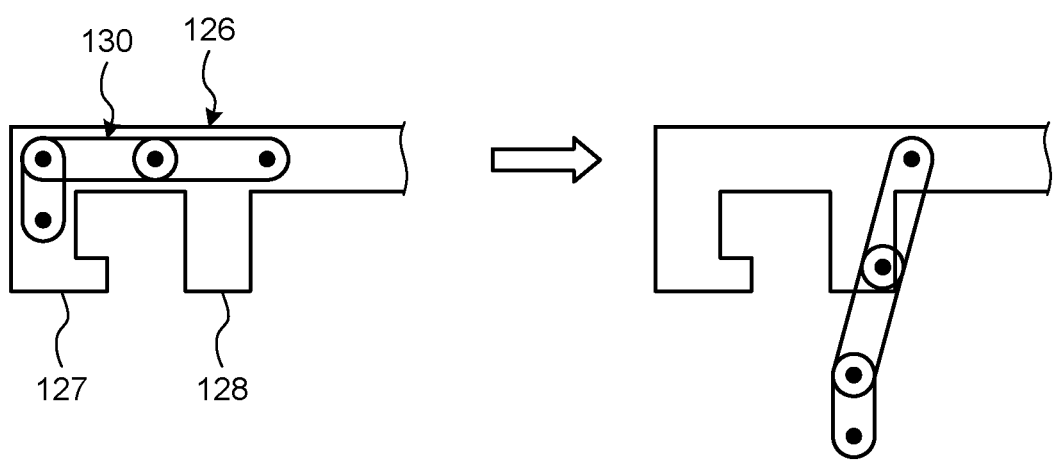
FIG. 20 is an explanatory diagram of the front end tool before/after a holding unit is stretched.

Next, a mobile robot 121 according to a fourth embodiment will be described with reference to FIGS. 18 to 20. FIG. 18 is an external perspective view of an exemplary front end tool to be attached to the mobile robot according to the fourth embodiment. FIG. 19 is a sectional view of the front end tool to be hooked to a rung of a ladder. FIG. 20 is an explanatory diagram of the front end tool before/after a holding unit is stretched. Also in the fourth embodiment, in order to avoid the overlapped description, parts which are different from those of the first to third embodiments will be described. Parts which are similar to those of the first to third embodiments will be denoted with the same reference signs and described.

A front end tool 13*c* illustrated in FIGS. 18 to 20 which is to be attached to the limb unit 12 of the mobile robot 121 according to the fourth embodiment has both functions of the front end tool 13*a* in FIG. 3 and the front end tool 13*b* in FIG. 4. The front end tool 13*c* includes a connection part 125 removably attached to the limb unit 12 and a toe part 126 provided on one side of the connection part 125. The connection part 125 is located between the toe part 126 and a heel part. The heel part provided on another side of the connection part 125 may have a similar structure to that of the toe part 126 and may have a similar structure to that of the heel part 53 of the front end tool 13*a* in FIG. 3 or the heel part 63 of the front end tool 13*b* in FIG. 4. The heel part is not limited.

In the front end tool 13*c*, a part opposite to an attached side to the limb unit 12 is grounded, and a flat surface P3 is formed on the part to be grounded. A locking groove (not shown) and a hook groove 55 are formed on the flat surface P3 similarly to the front end tool 13*a*. The hook groove 55 is formed at the position of the toe part 126. Here, the toe part 126 is formed by being branched into two parts which have a space 129 therebetween in a direction perpendicular to the direction of a connection between the toe part 126 and the heel part. In this way, two branching parts 127 are formed. Since the hook groove 55 is formed in the two branching parts 127, each of the two branching parts 127 is formed in a shape of a hook claw. Also, a locking part 128 which has the same surface as the flat surface P3 is formed in a part on a side of the connection part 125 of the space 129 in the front end tool 13*c*. Therefore, when the toe part 126 of the front end tool 13*c* is hooked to the rung 73 of the ladder 71, as illustrated in FIG. 19, the rung 73 is stored in the hook groove 55 of the branching parts 127 so that the two branching parts 127 are positioned on one side of the rung 73 and the locking part 128 is positioned on another side of the rung 73.

Here, as illustrated in FIG. 19, the locking part 128 is arranged between the two branching parts 127 in a direction to which the rung 73 extends. Therefore, even when the direction of the front end tool 13*c* is largely deviated from the direction in which the rung 73 extends according to a positioning error of the toe part 126, the front end tool 13*c* can be hooked to the rung 73.

Also, the holding unit 130, which can hold the object, is provided so as to be stored in the space 129 of the front end tool 13*c*. The holding unit 130 includes a plurality of fingers, and the fingers are stored in the space 129 in a state where they are along the shape of each branching part 127. As illustrated in FIG. 20, the plurality of fingers of the holding unit 130 is stretched at the time of working. On the other hand, the plurality of fingers is folded at the time of walking.

As described above, according to the fourth embodiment, when the two-legged walking or the four-legged walking is performed by using the front end tool 13*c*, the flat surface P3 can be grounded. Therefore, the stability at the time of moving can be increased. Also, when the mobile robot 121 climbs up/down the ladder 71 by using the front end tool 13*c*, the locking grooves of the front end tools 13*c* attached to the two limb units 12 on the lower side can be looked to the rung 73 of the ladder 71, and the hook grooves 55 of the front end tools 13*c* attached to the two limb units 12 on the upper side can be hooked to the rung 73 or the support 72 of the ladder 71. Therefore, the mobile robot 1 can preferably climb up/down the ladder 71. In addition, since the holding unit 130 can hold the object, the mobile robot 121 can work by using the holding unit 130. At this time, since the holding unit 130 can be stored in the space 129, the mobile robot 1 can climb up/down the ladder 71 without being blocked by the holding unit 130.

Figure 21:
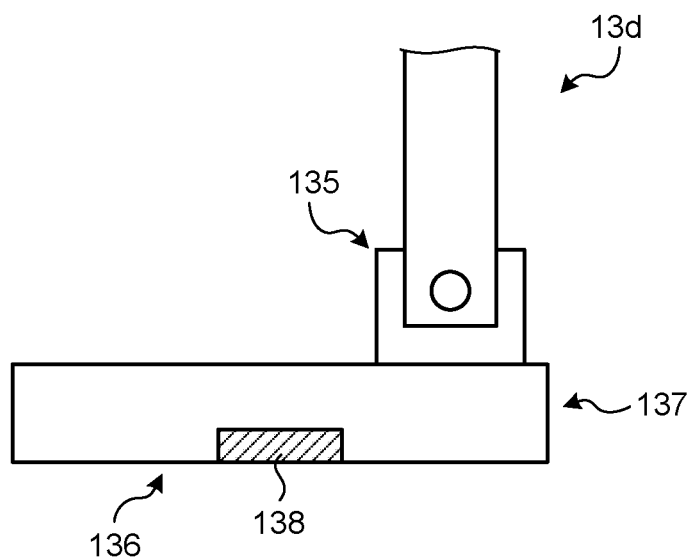
FIG. 21 is a schematic diagram of an exemplary front end tool to be attached to the mobile robot.
Figure 22:
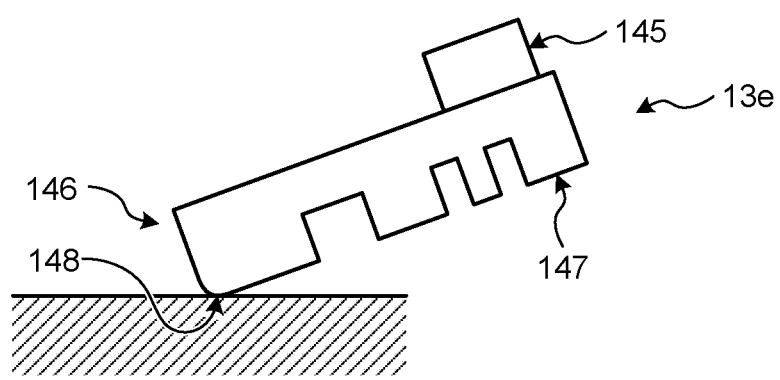
FIG. 22 is a schematic diagram of an exemplary front end tool to be attached to the mobile robot.

A front end tool 13*d* illustrated in FIG. 21 and a front end tool 13*e* illustrated in FIG. 22 may be applied. FIGS. 21 and 22 are schematic diagrams of an exemplary front end tool to be attached to the mobile robot.

The front end tool 13*d* illustrated in FIG. 21 includes a connection part 135 removably attached to the limb unit 12, a toe part 136 provided on one side of the connection part 135, and a heel part 137 provided on the other side of the connection part 135 which is located between the toe part 136 and the heel part 137. Also, a camera (image pickup device) 138 is provided in a part which is grounded of the front end tool 13*d*, and the camera 138 is provided at the position of the connection part 135.

When the front end tool 13*d* in FIG. 21 is used, the operator who operates the mobile robot 121 can easily recognize a moving environment around the front end tool 13d according to an image imaged by the camera 138.

The front end tool 13e illustrated in FIG. 22 includes a connection part 145 removably attached to the limb unit 12, a toe part 146 provided on one side across the connection part 145, and a heel part 147 provided on the other side across the connection part 145 which is located between the toe part 146 and the heel part 147. In the toe part 146, a part which is grounded at the time of standing on tiptoe and moving is a curved surface 148.

In a case where the front end tool 13e in FIG. 22 is used, a part to be the curved surface 148 of the toe part 146 of the front end tool 13e can be surely grounded, for example, even when the drive of a part of the plurality of limb-side drive shafts 32 of the limb unit 12 is stopped at the time of the four-legged walking. Therefore, since the drive of a part of limb-side drive shafts 32 can be stopped, power consumption can be reduced.

REFERENCE SIGNS LIST

1 MOBILE ROBOT
11 BODY UNIT
12 LIMB UNIT
13 FRONT END TOOL
21 BODY FRAME
22 BODY-SIDE DRIVE SHAFT
22p PITCH SHAFT
22r ROLL SHAFT
31 JOINT MODULE
32 LIMB-SIDE DRIVE SHAFT
32r ROLL SHAFT
32p PITCH SHAFT
32y YAW SHAFT
35 BASE END JOINT MODULE
36 INTERMEDIATE MODULE
37 FRONT JOINT MODULE
51 CONNECTION PART
52 TOE PART
53 HEEL PART
54 LOCKING GROOVE
55 HOOK GROOVE
61 CONNECTION PART
62 TOE PART
63 HEEL PART
64 HOLDING UNIT
71 LADDER
72 SUPPORT
73 RUNG
74 PROTECTION FENCE
101 MOBILE ROBOT (SECOND EMBODIMENT)
102 WHEEL
111 MOBILE ROBOT (THIRD EMBODIMENT)
112 RECESS HOLE
113 FLANGE
114 FASTENING MEMBER
116 FEMALE SCREW PART
117 MALE SCREW PART
121 MOBILE ROBOT (FOURTH EMBODIMENT)
125 CONNECTION PART
126 TOE PART
127 BRANCHING PART
128 LOCKING PART
129 SPACE
130 HOLDING UNIT
138 CAMERA
148 CURVED SURFACE

The invention claimed is:

1. A front end tool which is to be attached to a mobile robot having a plurality of different moving forms, the front end tool comprising
a body unit and a plurality of limb units of which a base end side is connected to the body unit,
wherein a part to be grounded is formed to be a flat surface,
wherein a locking groove which is locked to a first bar-shaped member and a hook groove which is hooked to a second bar-shaped member are formed side by side on the flat surface,
wherein the front end tool further comprises:
a connection part configured to be connected to the limb unit;
a toe part configured to be provided on one side across the connection part; and
a heel part configured to be provided on the other side across the connection part, and
wherein a part of the toe part which is grounded at a time of standing on tiptoe and moving is a curved surface.

2. The front end tool according to claim 1, wherein an image pickup device is provided.

3. A front end tool which is to be attached to a mobile robot having a plurality of different moving forms, comprising
a body unit and a plurality of limb units of which a base end side is connected to the body unit, wherein
wherein a part to be grounded is formed to be a flat surface, and the limb unit is connected to a part opposite to the flat surface,
wherein a locking groove which is locked to a first bar-shaped member and a hook groove which is hooked to a second bar-shaped member are formed in parallel on the flat surface,
wherein a part on the flat surface on the side of the hook groove is formed to be branched into two parts on both sides of a space, and
wherein a holding unit which holds an object is provided to be stored in the space,
wherein the front end tool further comprises:
a connection part configured to be connected to the limb unit;
a toe part configured to be provided on one side across the connection part; and
a heel part configured to be provided on the other side across the connection part, and
wherein a part of the toe part which is grounded at a time of standing on tiptoe and moving is a curved surface.

\* \* \* \* \*